United States Patent
Nishiyama et al.

(10) Patent No.: US 8,390,165 B2
(45) Date of Patent: Mar. 5, 2013

(54) SYNCHRONOUS MOTOR DRIVE SYSTEM

(75) Inventors: Noriyoshi Nishiyama, Osaka (JP);
Masaki Tagome, Osaka (JP); Yasuhiro Kondo, Osaka (JP); Makoto Kitabatake, Nara (JP); Shun Kazama, Osaka (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 12/995,143

(22) PCT Filed: May 28, 2009

(86) PCT No.: PCT/JP2009/002364
§ 371 (c)(1),
(2), (4) Date: Nov. 29, 2010

(87) PCT Pub. No.: WO2009/144946
PCT Pub. Date: Dec. 3, 2009

(65) Prior Publication Data
US 2011/0074239 A1    Mar. 31, 2011

(30) Foreign Application Priority Data

May 30, 2008  (JP) ................................. 2008-142798
May 30, 2008  (JP) ................................. 2008-142799

(51) Int. Cl.
*H02K 3/04* (2006.01)
*H02K 1/00* (2006.01)
(52) U.S. Cl. ........ 310/208; 310/195; 310/179; 310/180; 310/198
(58) Field of Classification Search .................. 310/208, 310/195, 179, 180, 198
See application file for complete search history.

(56) References Cited

U.S. PATENT DOCUMENTS

| | | | | |
|---|---|---|---|---|
| 1,545,175 | A * | 7/1925 | Turbayne ...................... | 323/203 |
| 4,271,380 | A * | 6/1981 | Bradler et al. ................ | 318/245 |
| 5,233,253 | A * | 8/1993 | Nishio et al. .................. | 310/184 |
| 5,834,866 | A * | 11/1998 | Fujitani et al. ............. | 310/49.33 |
| 6,034,460 | A | 3/2000 | Tajima et al. | |
| 6,285,104 | B1 * | 9/2001 | Nashiki ........................ | 310/184 |
| 6,396,183 | B1 | 5/2002 | Tajima et al. | |
| 6,734,592 | B2 | 5/2004 | Tajima et al. | |
| 6,949,856 | B2 | 9/2005 | Tajima et al. | |
| 7,196,447 | B2 | 3/2007 | Tajima et al. | |
| 7,215,055 | B2 | 5/2007 | Tajima et al. | |
| 7,288,868 | B2 * | 10/2007 | Tamaki et al. ............. | 310/254.1 |
| 7,417,349 | B2 | 8/2008 | Tajima et al. | |

(Continued)

FOREIGN PATENT DOCUMENTS

| | | |
|---|---|---|
| JP | 09-285088 | 10/1997 |
| JP | 11-069751 | 3/1999 |

(Continued)

*Primary Examiner* — Tran Nguyen
*Assistant Examiner* — Alex W Mok

(57) ABSTRACT

Provided is a synchronous motor including a rotor having magnetic poles distributed circumferentially along a rotation direction of the rotor at equal intervals, and a stator having stator teeth arranged circumferentially along the rotation direction of the rotor, each tooth wound with a stator coil by concentrated winding. Every M consecutive stator teeth belong to one of stator teeth groups arranged at equal intervals. The M consecutive stator teeth in each stator teeth group are arranged at intervals different from the intervals of the magnetic poles of the rotor. The stator coils wound around the M consecutive stator teeth are connected to separate terminals. A motor driver supplies currents of different phases to the stator coils via the respective terminals.

15 Claims, 29 Drawing Sheets

U.S. PATENT DOCUMENTS

| | | | |
|---|---|---|---|
| 7,671,502 B2 * | 3/2010 | Tajima et al. | 310/156.53 |
| 7,936,099 B2 * | 5/2011 | Staudemann et al. | 310/71 |
| 2002/0047430 A1 * | 4/2002 | Iwasaki et al. | 310/156.39 |
| 2002/0047450 A1 * | 4/2002 | Asao et al. | 310/184 |
| 2002/0130576 A1 | 9/2002 | Tajima et al. | |
| 2004/0251763 A1 | 12/2004 | Tamaki et al. | |
| 2007/0194650 A1 * | 8/2007 | Ito et al. | 310/179 |
| 2007/0228863 A1 * | 10/2007 | Liang et al. | 310/180 |
| 2009/0102308 A1 * | 4/2009 | Koide et al. | 310/195 |
| 2009/0309449 A1 | 12/2009 | Tajima et al. | |

FOREIGN PATENT DOCUMENTS

| | | |
|---|---|---|
| JP | 2000-041392 | 2/2000 |
| JP | 2003-244915 | 8/2003 |
| JP | 2004-64837 | 2/2004 |
| JP | 2005-039932 | 2/2005 |
| JP | 2005-102475 | 4/2005 |
| JP | 2007-166767 | 6/2007 |
| JP | 2007-325447 | 12/2007 |
| JP | 2008-005603 | 1/2008 |

* cited by examiner

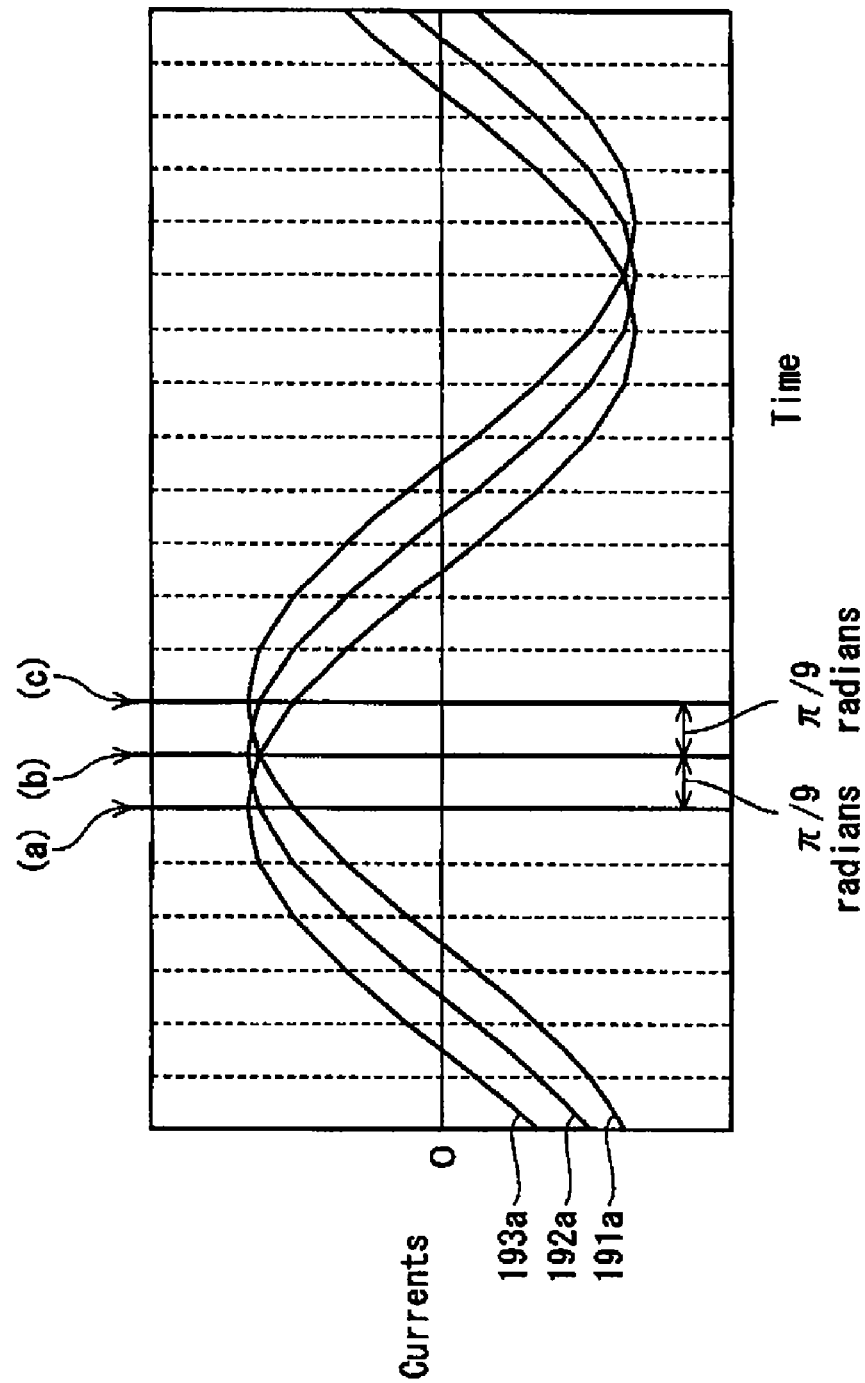

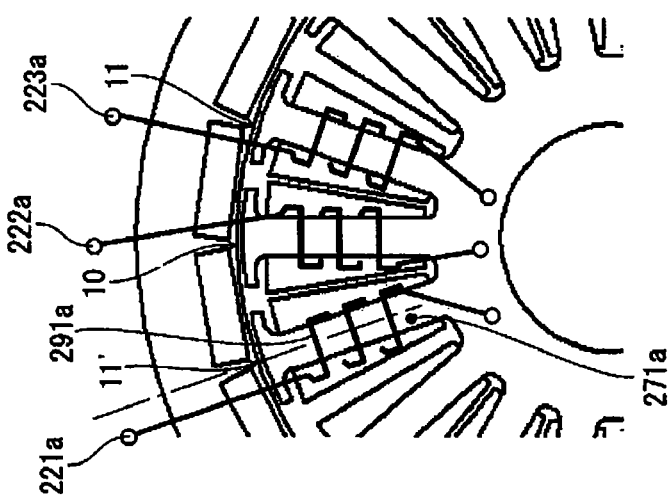
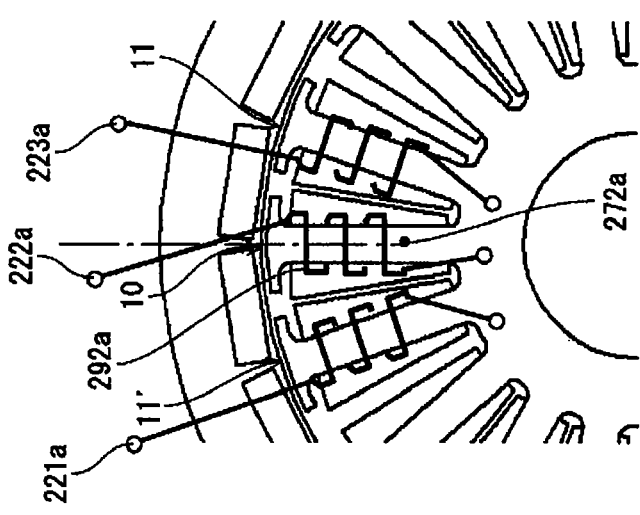
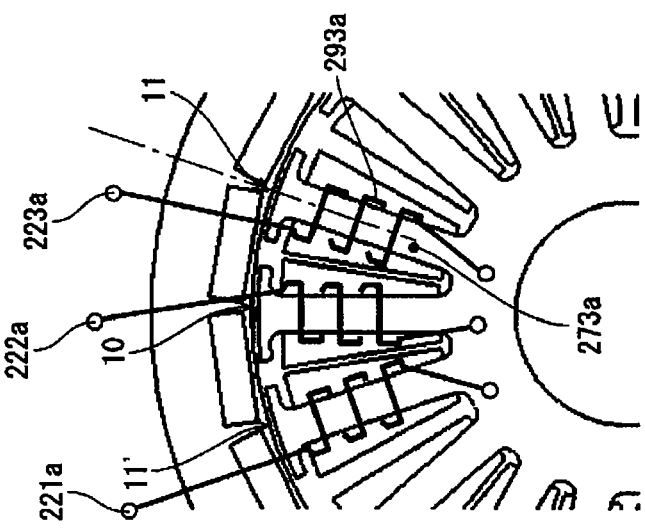

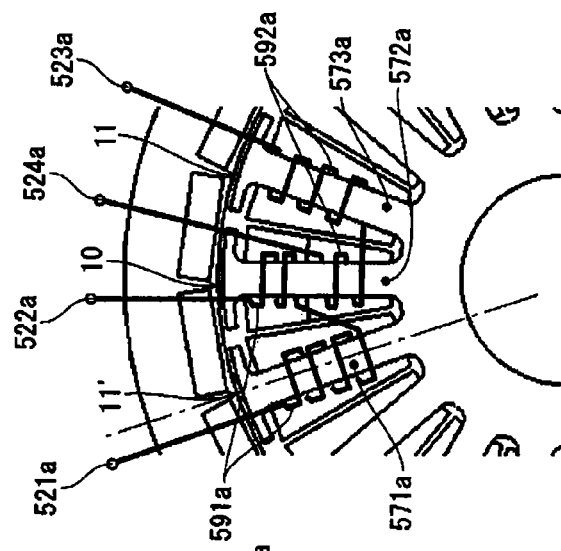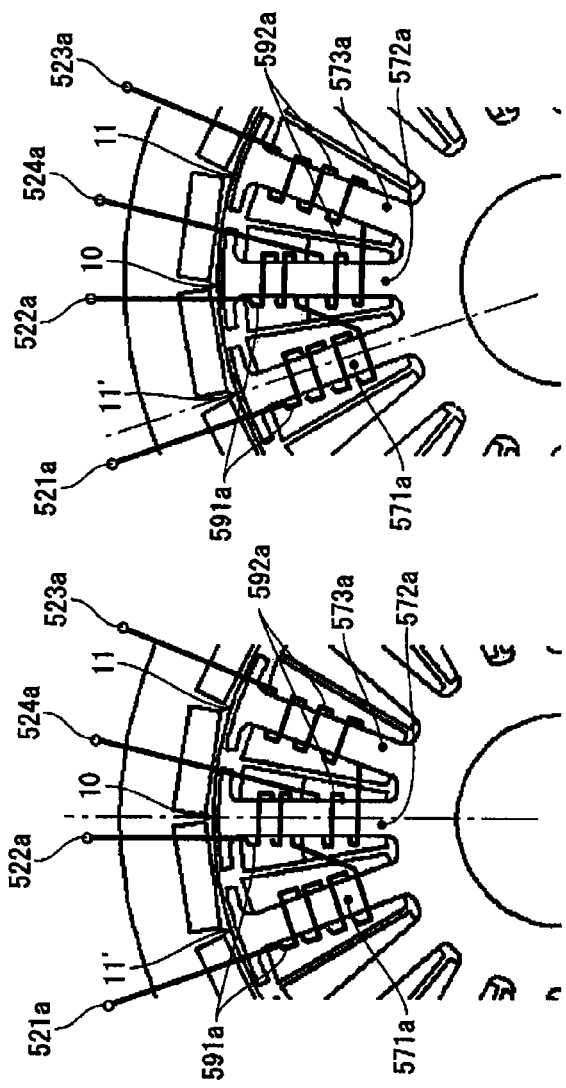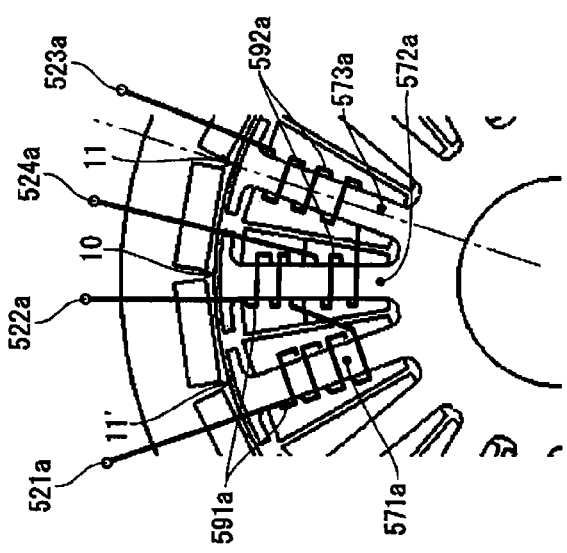

SYNCHRONOUS MOTOR DRIVE SYSTEM

TECHNICAL FIELD

The present invention relates to a synchronous motor drive system that includes a synchronous motor and a motor driver, and in particular to techniques for improving torque performance.

BACKGROUND ART

It is required for a synchronous motor particularly used in a compressor, an electrical vehicle, a hybrid vehicle, a fuel-cell-powered vehicle, and such to generate high torque with a low ripple, due to a demand for reduction in size, vibration, and noise, and improvement in output and efficiency.

In a surface magnet synchronous motor in which permanent magnets are distributed on the surface of an iron core, torque generated by the permanent magnets (i.e. magnet torque) is maximized when a phase difference between a field generated by the permanent magnets and an armature current is 90 degrees. In other words, the magnet torque is maximized if a current supplied to a stator coil is maximized when a point between magnet poles of the rotor and a stator tooth wound with the stator coil are aligned. The torque decreases as the phase difference between the field generated by the permanent magnets and the armature current is deviated from 90 degrees.

In an interior permanent magnet synchronous motor in which permanent magnets are embedded in an iron core, the following two types of torque are generated. One is magnet torque generated by the permanent magnets. The other is reluctance torque resulting from saliency due to a difference in magnetic resistance that is determined by positions of a rotor and a stator. The reluctance torque is maximized when a phase difference between the field generated by the permanent magnets and an armature current is approximately 45 degrees. Accordingly, the interior permanent magnet synchronous motor yields torque which is the sum of the magnet and the reluctance torque. The total torque is maximized when the phase difference between the field and the armature current is approximately 0 to 45 degrees.

Generally speaking, torque generated in a synchronous motor has ripple components generated under influence of a harmonic wave component of a field generated by a permanent magnet and of a harmonic wave component of an armature current. In an attempt to reduce the torque components, a technique has been conceived for adjusting the positions of stator coils supplied with currents of the same phase such that the intervals (angles) between the stator coils are mechanically offset relative to intervals (angles) between magnet poles of a rotor. This makes torque ripples generated in the respective stator coils out of phase from each other. As a result, the torque ripples are cancelled out by each other, whereby vibration and noise is reduced (Patent Literatures 1 and 2).

Patent Literature 1 discloses a synchronous motor in which a stator coil is wound around one stator tooth (i.e. concentrated winding type). In the synchronous motor, the number of magnet poles of the rotor is set to be 10, and the number of stator teeth is set to be 12. As for the stator teeth, two stator teeth group sets each composed of U+ phase, U− phase, V+ phase, V− phase, W+ phase, and W− phase are arranged in the stated order. In this case, stator coils supplied with a current of the same phase (e.g. U+ phase and U− phase) are arranged with an offset of $\pi/6$ electrical radians. This means that torque ripples generated in the respective stator coils are out of phase from each other by $\pi/6$ radians. Consequently, the torque ripples are reduced.

Patent Literature 2 discloses a technique for reducing cogging torque, which is a torque ripple generated in a state where a current is not supplied. According to the technique, cogging torque is reduced by setting a relation between the number of slots (i.e. teeth) around which stator coils are disposed and the number of magnet poles of a rotor to be 18 to 20, compared with a conventional synchronous motor with 12 slots to 8 magnet poles or with 9 slots to 8 magnet poles.

CITATION LIST

Patent Literature

Patent Literature 1: Japanese patent application publication No. H9-285088

Patent Literature 2: Japanese patent application publication No. 2003-244915

Patent Literature 3: Japanese patent application publication No. 2000-041392

SUMMARY OF INVENTION

Technical Problem

As mentioned above, by adjusting the positions of the stator coils supplied with currents of the same phase so that the intervals between the stator coils are mechanically offset relative to the intervals of magnet poles, torque ripples generated in the respective stator coils are made out of phase from each other. As a result, torque ripples are reduced.

However, the above structures involve a problem that, in a stator coil group supplied with a current of the same phase, at the time when one stator coil is in such a position relative to a magnet pole of the rotor that it generates maximum torque, the remaining stator coils in the group cannot generate maximum torque. This is because that the stator coils are arranged at intervals different from those between magnet poles of the rotor. In other words, according to conventional techniques, the attempt to reduce torque ripples adversely entails a reduction in total torque.

In view of the above-mentioned problem, the present invention aims to provide techniques for reducing torque ripples, while also suppressing a reduction in torque.

Solution to Problem

A first aspect of the present invention provides a synchronous motor drive system including a synchronous motor and a motor driver, the synchronous motor comprising: a rotor having magnetic poles distributed circumferentially along a rotation direction of the rotor at equal intervals; and a stator having stator coils arranged circumferentially along the rotation direction of the rotor, each coil wound by concentrated winding, wherein every M consecutive stator coils belong to a different one of stator coil groups arranged at equal intervals, M being an integer two or greater, at least two consecutive stator coils in each stator coil group are arranged at an interval different from the intervals of the magnetic poles of the rotor and connected to separate terminals, and the motor driver supplies currents of different phases to the at least two consecutive stator coils via the respective terminals and causes the at least two consecutive stator coils to generate magnetic fields having opposite polarities.

A second aspect of the present invention provides a synchronous motor drive system including a synchronous motor and a motor driver, the synchronous motor comprising: a rotor having magnetic poles distributed circumferentially along a rotation direction of the rotor at equal intervals; and a stator having stator teeth arranged circumferentially along the rotation direction of the rotor, wherein every M consecutive stator teeth belong to a different one of stator teeth groups arranged at equal intervals, M being an integer three or greater, at least two of consecutive first, second, and third stator teeth in each stator teeth group are arranged at an interval different from the intervals of the magnetic poles of the rotor, the first stator tooth is wound with part of a first stator coil, the third stator tooth is wound with part of a second stator coil, the second stator tooth is wound with a remaining part of the first stator coil and a remaining part of the second stator coil, the first and the second stator coils are connected to separate terminals, and the motor driver supplies currents of different phases to the first and the second stator coils via the respective terminals.

Advantageous Effects of Invention

According to the first aspect of the present invention, the at least two consecutive stator coils are arranged at an interval different from the intervals of the magnet poles of the rotor. Accordingly, cogging toque, which is a torque ripple generated in a state where a current is not supplied, is reduced. Further, the at least two consecutive stator coils are connected to the separate terminals, and supplied with the currents of different phases. By this means, phase differences between the fields generated by the magnet poles of the rotor and armature currents supplied to the stator coils can be separately controlled. This reduces torque ripples, while suppressing a decrease in torque.

Furthermore, in the above structure, the stator coils are wound by concentrated winding. For this reason, compared with the synchronous motor disclosed in Patent Literature 3 in which stator coils are wound by distributed winding, the coil end portions can be lowered, and the lengths of the coils are shortened. Accordingly, the synchronous motor of compact size and high efficiency can be realized.

According to the second aspect of the present invention, at least two of the first, the second, and the third stator teeth are arranged at an interval different from the intervals of the magnetic poles of the rotor. Accordingly, cogging toque, which is the torque ripple generated in the state where a current is not supplied, is reduced. Further, the first and the second stator coils are connected to the separate terminals, and supplied with the currents of different phases. By this means, phase differences between the fields generated by the magnet poles of the rotor and the armature currents supplied to the stator coils can be separately controlled. This reduces torque ripples, while suppressing a decrease in torque.

Furthermore, in the above structure, the stator coils are wound by a method similar to concentrated winding. For this reason, compared with the synchronous motor disclosed in Patent Literature 3 in which stator coils are wound by distributed winding, the coil end portions can be lowered, and the lengths of the coils are shortened. Accordingly, the synchronous motor of compact size and high efficiency can be realized.

BRIEF DESCRIPTION OF DRAWINGS

FIG. 5 shows temporal transitions of currents supplied to stator coils in the first embodiment.

FIGS. 10A, 10B, and 10C show positional relations between a stator and a rotor pertaining to the second embodiment of the present invention.

FIGS. 21A, 21B, and 21C show positional relations between a stator and a rotor pertaining to the fifth embodiment of the present invention.

DESCRIPTION OF EMBODIMENTS

A detailed description of embodiments of the present invention is given below with reference to figures.

First Embodiment

<Synchronous Motor>

Figure 1:
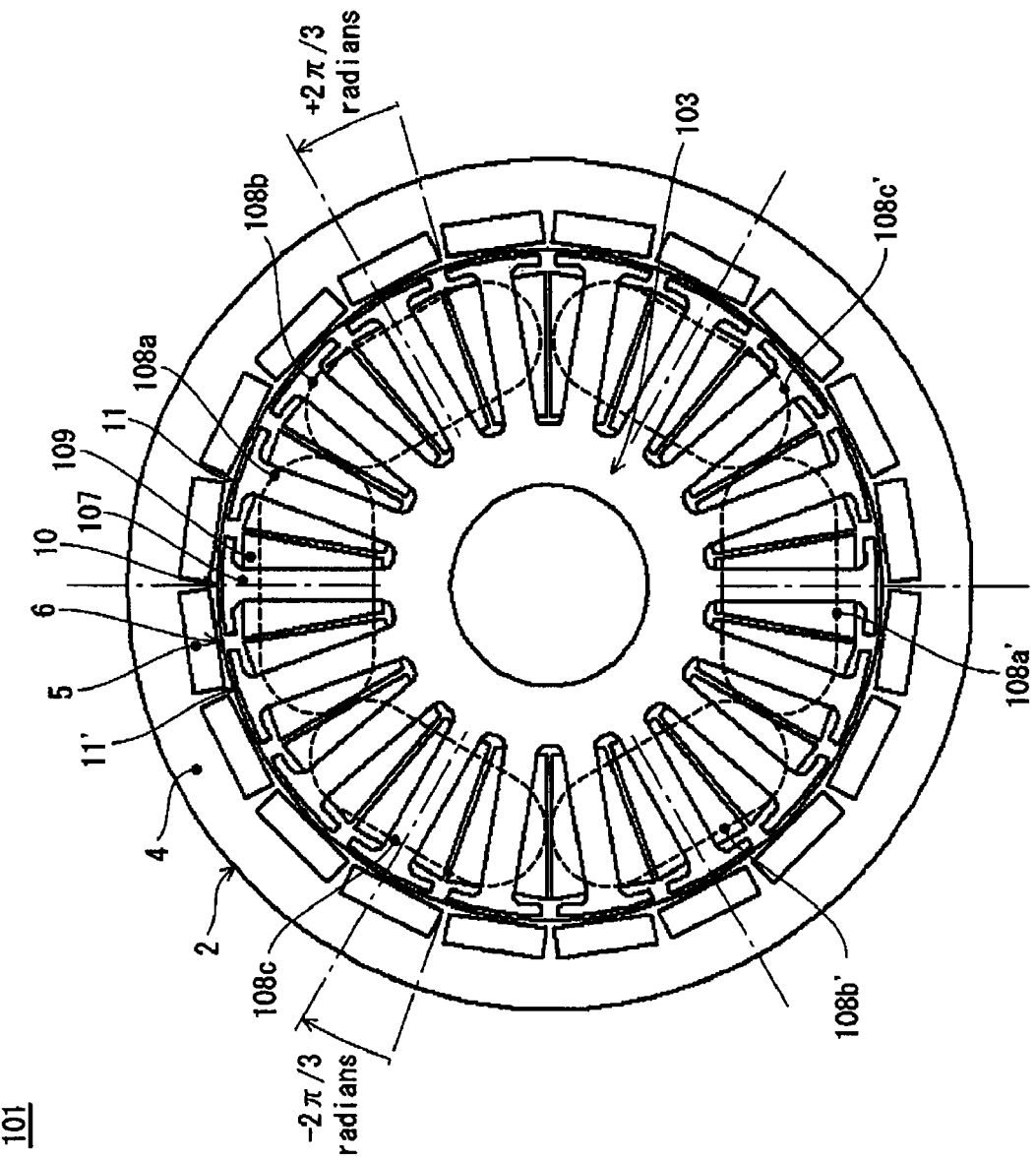
FIG. 1 is a plan view showing a synchronous motor included in a synchronous motor drive system pertaining to a first embodiment of the present invention.
Figure 2:
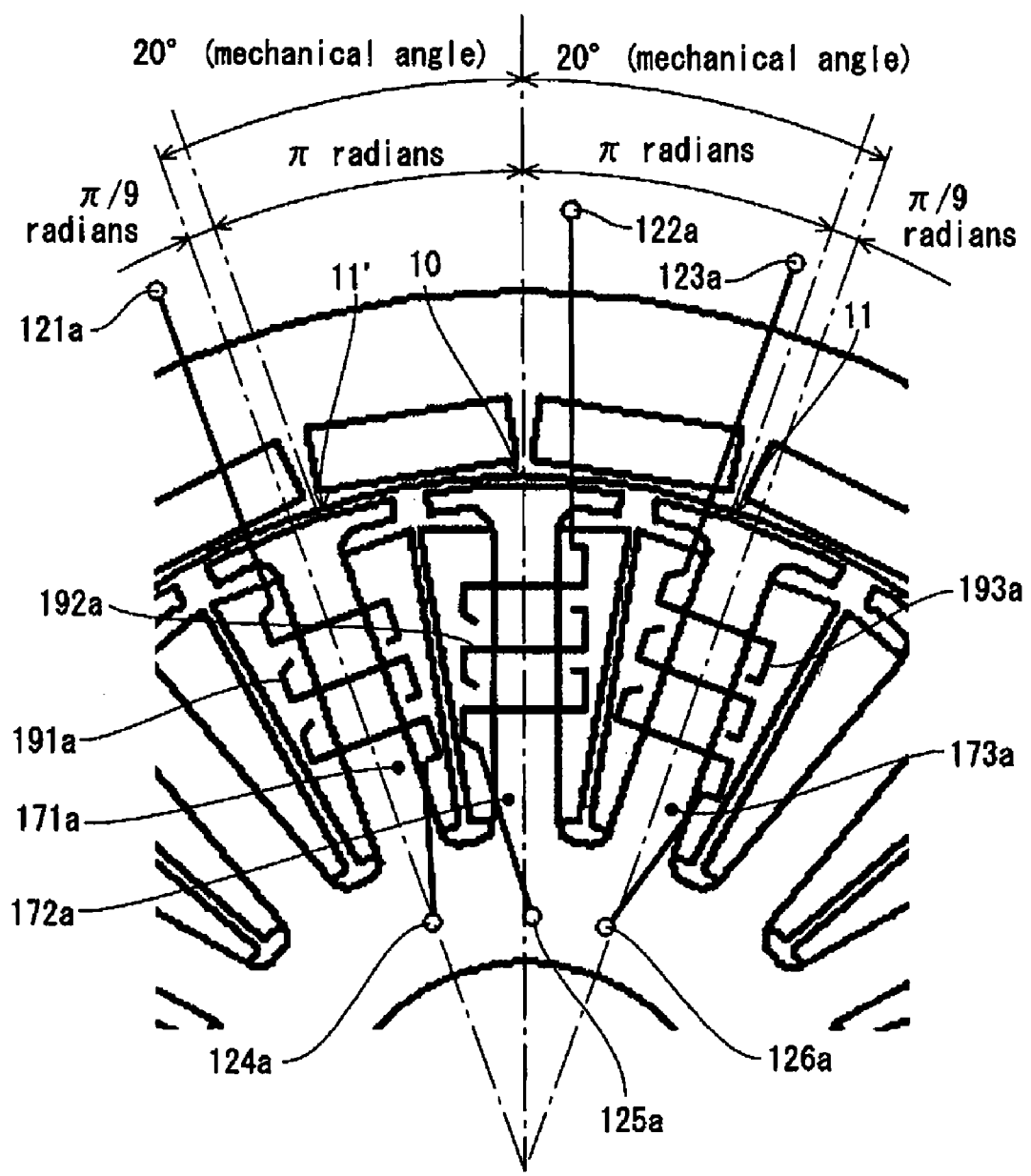
FIG. 2 is a detail view of the synchronous motor shown in FIG. 1.

FIG. 1 is a plan view showing a synchronous motor included in a synchronous motor drive system pertaining to a first embodiment of the present invention. FIG. 2 is a detail view of the synchronous motor shown in FIG. 1.

The synchronous motor 101 includes a rotor 2 and a stator 103.

The rotor 2 includes a rotor core 4 and a plurality of permanent magnets 5. The permanent magnets 5 are arranged circumferentially along a rotation direction of the rotor 2 in the rotor core 4 at equal angular intervals. The permanent magnets 5 form magnetic poles 6 composed of pairs of N-poles and S-poles. The N-poles and S poles are alternately arranged with respect to the stator 103. Each magnetic pole pair of an N-pole and an S-pole equals to $2\pi$ electrical radians, and is arranged so that each magnetic pole equals to $\pi$ electrical radians. In the present embodiment, the rotor 2 has 20 magnetic poles, and the electrical angle is ten times the mechanical angle.

In FIG. 1, points 10 and 11 between magnetic poles of the rotor 2 are shown. The points 10 and 11 between magnetic poles of the rotor 2 indicate positions of magnetic neutral points between the N-poles and the S-poles formed by the permanent magnets 5 arranged in the rotor 2. In this embodiment, the points 10 and 11 between magnetic poles coincide with mechanical positions midway between two magnets. When seen from the counterclockwise direction, an N-pole changes over to an S-pole at a point 10 between magnetic poles and an S-pole changes over to an N-pole at a point 11 between magnetic poles. Note that a point 11' between magnetic poles is the same as the point 11 between magnetic poles in terms of electrical angle, but is different from the point 11 between magnetic poles in terms of mechanical angle.

The stator 103 includes a plurality of stator teeth 107 arranged diametrically opposite to the rotor 2, and stator coils 109 each wound around a stator tooth 107 by concentrated winding. Every M consecutive stator teeth 107 (where M=3 in this embodiment) arranged circumferentially along an outer circumference of the stator 103 belong to one of a plurality of stator teeth groups 108. Each stator tooth 107 is wound with a stator coil 109 by concentrated winding. It can also be said that every three consecutive stator coils belong to one of a plurality of stator teeth groups 108. In the present embodiment, there are six stator teeth groups 108 arranged at intervals of 60 mechanical degrees.

It is assumed that the counterclockwise rotation direction is + in FIG. 1. A stator teeth group 108b is arranged with an offset of −60 mechanical degrees, that is, $+2\pi/3$ electrical radians with respect to a stator teeth group 108a. A stator teeth group 108c is arranged with an offset of +60 mechanical degrees, that is, $+4\pi/3$ electrical radians (i.e. $-2\pi/3$ electrical radians) with respect to the stator teeth group 108a. Accordingly, the stator teeth group 108a, the stator teeth group 108b, and the stator teeth group 108c are arranged at intervals of $2\pi/3$ electrical radians. In the synchronous motor of the present embodiment, two, stator teeth group sets each composed of the stator teeth group 108a, the stator teeth group 108b, and the stator teeth group 108c are arranged circumferentially (so there are also a stator teeth group 108a', a stator teeth group 108b', and a stator teeth group 108c').

Twenty magnetic poles 6 are circumferentially arranged in the rotor 2 at intervals of 360/20=18 degrees. On the other hand, 18 stator teeth 107 are circumferentially arranged at equal intervals (i.e. 360/18=20 degrees in mechanical angle). Accordingly, the magnetic poles 6 and the stator teeth 107 are offset at a ratio of 10 to 9 per semicircle.

FIG. 2 shows the structure of the stator teeth group 108a. This structure also applies to the stator teeth group 108b and the stator teeth group 108c.

The stator teeth group 108a is composed of three consecutive stator teeth 171a, 172a, and 173a. The stator teeth 171a, 172a, and 173a are respectively wound with the stator coils 191a, 192a, and 193a by concentrated winding such that the winding direction of each of the stator coils 191a, 192a, and 193a is alternately opposite to each other.

The stator tooth 171a is positioned at +20 mechanical degrees (i.e. with an additional offset of $+\pi/9$ radians besides an offset of $\pi$ radians) with respect to the stator tooth 172a.

The stator tooth 173a is positioned at −20 mechanical degrees (i.e. with an additional offset of $-\pi/9$ radians besides an offset of n radians) with respect to the stator tooth 172a.

Figure 3:
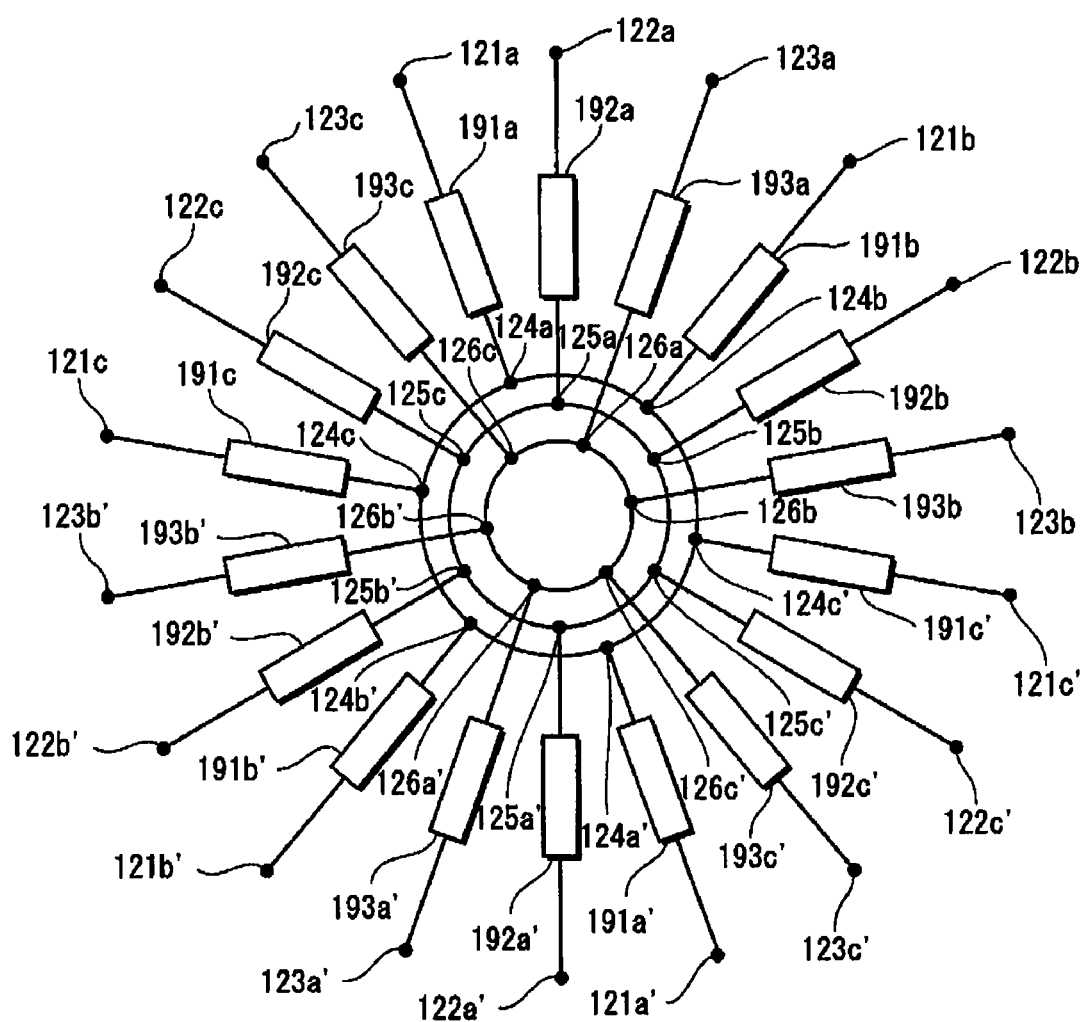
FIG. 3 is a view illustrating stator coil connections of the synchronous motor shown in FIG. 1.

FIG. 3 is a view illustrating stator coil connections of the synchronous motor shown in FIG. 1.

The alphabetical letters a, b, and c following the reference signs of the stator coil terminals shown in the figure correspond to coils belonging to the stator teeth groups 108a, 108b, and 108c, respectively.

The three stator coils 191a, 192a, and 193a belonging to the stator teeth group 108a respectively have coil terminals 121a, 122a, and 123a. The coil terminals 121a, 122a, and 123a separately extend outside to be connected to connection terminals of the inverters (i.e. motor drivers). Similarly, the three coil terminals 121b, 122b, and 123b in the stator teeth group 108b extend outside to be connected to separate connection terminals of the inverters (i.e. motor drivers). The three coil terminals 121c, 122c, and 123c in the stator teeth group 108c separately extend outside to be connected to connection terminals of the inverters (i.e. motor drivers).

Besides, the three stator coils 191a, 192a, and 193a belonging to the stator teeth group 108a have coil terminals 124a, 125a, and 126a, respectively. The coil terminals 124a, 125a, and 126a are connected to the first, the second, and the third neutral points, respectively. This also applies to the three coil terminals 124b, 125b, and 126b belonging the stator teeth group 108b, and the three coil terminals 124c, 125c, and 126c belonging to the stator teeth group 108c. In this way, the stator coil terminals in different stator teeth groups 108a, 108b, and 108c are connected to common neutral points in a manner such that the connected terminals have a phase difference of $2\pi/3$ radians with each other. More specifically, coil terminals 124a, 124b, and 124c are connected to the first neutral point. Coil terminals 125a, 125b, and 125c are connected to the second neutral point. Coil terminals 126a, 126b, and 126c are connected to the third neutral point. Although in this example the first, second, and third neutral points are electrically separated, two or all of them may be electrically connected.

Further, there are two rotor teeth groups 108a, two rotor teeth groups 108b, and two rotor teeth groups 108c. Teeth groups with the same one of the alphabetical letters a, b, and c each have the same positional relations in terms of electrical angle with respect to the magnetic poles of the rotor. Accordingly, three consecutive groups among six stator teeth groups may have a neutral point connection. It is also possible that three alternately arranged stator teeth groups have a neutral point connection. It is even possible that all six stator teeth groups have a neutral point connection.

As mentioned above, in the synchronous motor 101, 18 stator teeth are arranged at different intervals from the magnetic poles of the rotor. Every three circumferentially consecutive stator teeth belong to one of the plurality of stator teeth groups. Three stator teeth in each stator teeth group are connected to separate external terminals.

The term "separate" mentioned above refers to a relation between stator coils belonging to a single stator teeth group, and does not refer to a relation between stator coils belonging to different stator teeth groups. Accordingly, stator coils belonging to different stator teeth groups may be commonly connected if condition permits. For example, the stator coil 191*a* in the stator teeth group 108*a* and the stator coil 191*a*' in the stator teeth group 108*a*' may be connected to a common external terminal, because these stator coils are supplied with currents of the same phase. Naturally, the stator coils may be separately connected to external terminals.

<Driving Method>

Next, a description is given of a method for driving the synchronous motor 101.

Figure 4C:
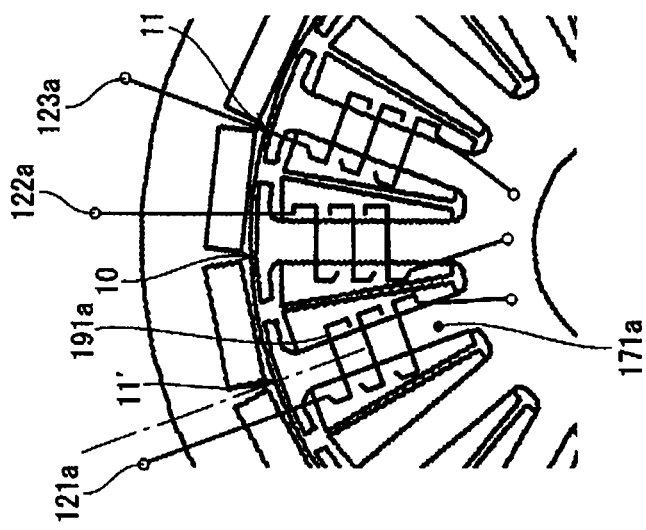
FIGS. 4A, 4B, and 4C show positional relations between a stator and a rotor pertaining to the first embodiment of the present invention.
Figure 4B:
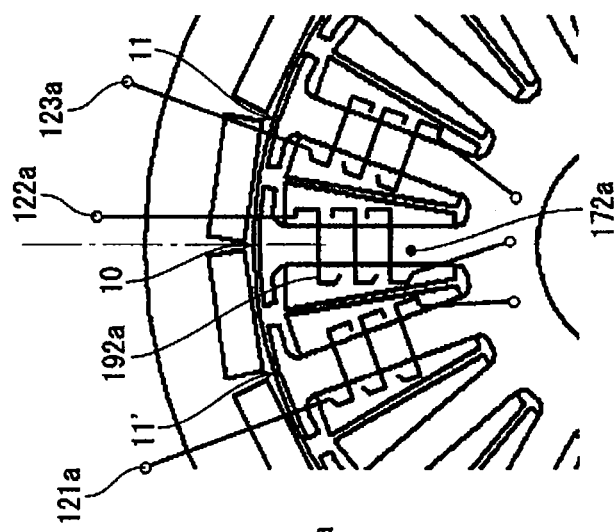
Figure 4A:
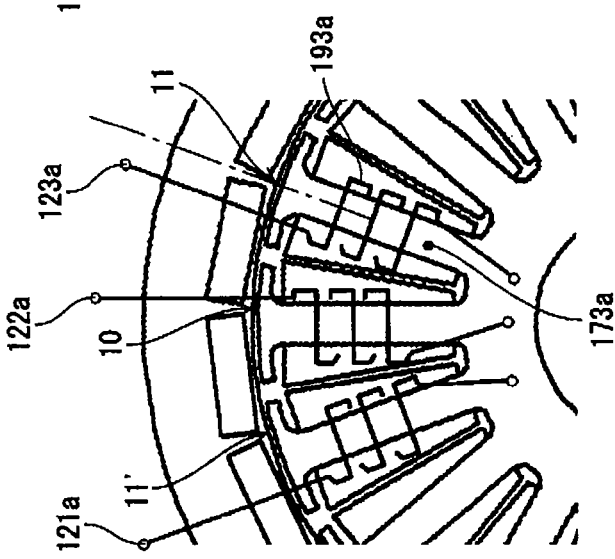

FIGS. 4A, 4B, and 4C show positional relations between a stator and a rotor pertaining to the first embodiment of the present invention. FIG. 4A shows the positional relation in a certain state. FIG. 4B shows the positional relation in the state in which the rotor 2 has been rotated by 2 mechanical degrees (i.e. π/9 electrical radians) anti-clockwise from the state shown in FIG. 4A. FIG. 4C shows the positional relation in the state in which the rotor 2 has been rotated by 2 mechanical degrees (i.e. π/9 electrical radians) anti-clockwise from the state shown in FIG. 4B. FIG. 5 shows currents supplied to the stator coils shown in FIGS. 4A, 4B, and 4C. Time points shown as (a), (b), and (c) in FIG. 5 correspond to the positional relations shown in FIG. 4A, FIG. 4B, and FIG. 4C, respectively.

In the positional relation shown in FIG. 4A, the center of the stator tooth 173*a* and the point 11 between magnetic poles of the rotor are aligned, as indicated by the chain line. On the other hand, the center of the stator tooth 172*a* and the point 10 between magnetic poles of the rotor are not aligned. Also, the center of the stator tooth 171 *a* and the point 11' between magnetic poles of the rotor are not aligned. This is because that an angle (i.e. 18 mechanical degrees) between two consecutive magnet poles of the rotor is different from an angle (i.e. 20 mechanical degrees) between two consecutive stator teeth, as described with reference to FIG. 2. In the positional relation shown in FIG. 4A, it is possible to maximize magnet torque caused by the permanent magnets, by supplying currents while adjusting the current phases so as to maximize the current flowing to the stator coil 193*a*.

FIG. 4B shows the positional relation in the state in which the rotor 2 has been rotated by 2 mechanical degrees (i.e. π/9 electrical radians) anti-clockwise from the state shown in FIG. 4A. In the positional relation shown in FIG. 4B, the center of the stator tooth 172*a* and the point 10 between magnetic poles of the rotor are aligned, as indicated by the chain line. On the other hand, the center of the stator tooth 173*a* and the point 11 between magnetic poles of the rotor are not aligned. Also, the center of the stator tooth 171*a* and the point 11' between magnetic poles of the rotor are not aligned. In the positional relation shown in FIG. 4B, it is possible to maximize magnet torque generated between the stator tooth 172*a* and the magnetic poles, by supplying currents while adjusting the current phases so as to maximize the current flowing to the stator coil 192*a*.

FIG. 4C shows the positional relation in the state in which the rotor 2 has been rotated by 2 mechanical degrees (i.e. π/9 electrical radians) anti-clockwise from the state shown in FIG. 4B. In the positional relation shown in FIG. 4C, the center of the stator tooth 171*a* and the point 11' between magnetic poles of the rotor are aligned, as indicated by the chain line. On the other hand, the center of the stator tooth 173*a* and the point 11 between magnetic poles of the rotor are not aligned. Also, the center of the stator tooth 172*a* and the point 10 between magnetic poles of the rotor are not aligned. In the positional relation shown in FIG. 4C, it is possible to maximize magnet torque generated between the stator tooth 171*a* and the magnetic poles, by supplying currents while adjusting the current phases so as to maximize the current flowing to the stator coil 191*a*.

FIG. 5 shows temporal transitions of currents applied to the stator coils 191*a*, 192*a*, and 193*a*. With respect to the current supplied to the stator coil 192*a*, the current supplied to the stator coil 193*a* is advanced by π/9 radians. On the other hand, with respect to the current supplied to the stator coil 192*a*, the current supplied to the coil terminal 191*a* is delayed by π/9 radians.

As mentioned above, in each of the positional relations shown in FIG. 4A, FIG. 4B, and FIG. 4C, the current phases of the currents supplied to the respective stator coils are adjusted so as to maximize the magnet torque generated between the stator coils and the magnetic poles. Accordingly, the overall torque is increased.

Between the arrangement of the stator coils and the currents supplied to the stator coils, the following relation is satisfied.

With respect to the stator coil 192*a*, the stator coil 193*a* is arranged with an additional offset of −π/9 radians besides an offset of π electrical radians. Regarding such an arrangement, with respect to the current supplied to the stator coil 192*a*, the current supplied to the stator coil 193*a* is advanced by π/9 radians. On the other hand, with respect to the stator coil 192*a*, the stator coil 191*a* is arranged with an additional offset of +π/9 radians besides an offset of π electrical radians. Regarding such an arrangement, with respect to the current supplied to the stator coil 192*a*, the current supplied to the stator coil 191*a* is delayed by π/9 radians. This maximizes the current flowing to a stator coil wound around a stator tooth in the positional relation in which the center of the stator tooth and a point between magnetic poles of the rotor are aligned.

<Synchronous Motor Drive System>

Figure 6:
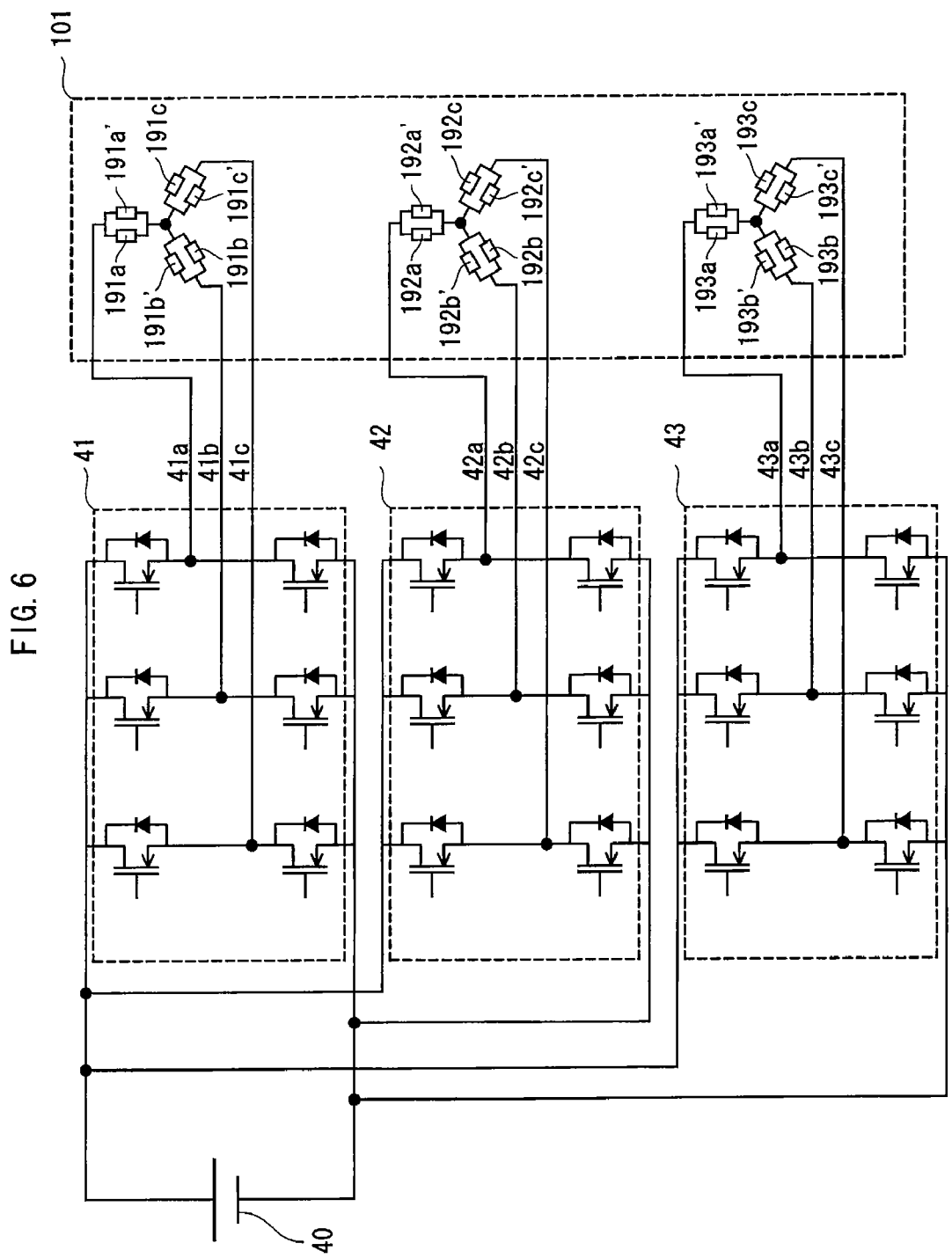
FIG. 6 shows an overall structure of the synchronous motor drive system pertaining to the first embodiment of the present invention.

FIG. 6 shows an overall structure of the synchronous motor drive system pertaining to the first embodiment of the present invention.

The synchronous motor drive system includes the motor driver and the synchronous motor 101. The motor driver includes a DC power supply 40 and inverters 41, 42, and 43. The inverters 41, 42, and 43 each generate three-phase currents to supply to the synchronous motor 101. The output currents 41*a*, 41*b*, and 41*c* supplied from the inverter 41 are out of phase from each other by 2π/3 radians. Similarly, the output currents 42*a*, 42*b*, and 42*c* supplied from the inverter 42 are out of phase from each other by 2π/3 radians. The output currents 43*a*, 43*b*, and 43*c* supplied from the inverter 43 are out of phase from each other by 2π/3 radians.

Attention is now paid to the output currents 41*a*, 42*a*, and 43*a* among the output currents supplied from the inverters 41, 42, and 43. The phase of the output current 42*a* is advanced by π/9 radians from the output current 41*a*. The phase of the output current 43a is advanced by π/9 radians from the output current 42a. This also applies to the output currents 41b, 42b, and 43b. The phase of the output current 42b is advanced by π/9 radians from the output current 41b. The phase of the output current 43b is advanced by π/9 radians from the output current 42b. Similarly, regarding the output currents 41c, 42c, and 43c, the phase of the output current 42c is advanced by π/9 radians from the output current 41c. The phase of the output current 43c is advanced by π/9 radians from the output current 42c. The output currents 41a, 42a, and 43a correspond to the currents 191a, 192a, and 193a in FIG. 5, respectively.

<Effects>

As mentioned above, in the synchronous motor 101, the intervals between the magnet poles of the rotor are 18 mechanical degrees (π electrical radians) while the intervals between three consecutive stator teeth belonging to a stator teeth group are 20 mechanical degrees. With such a mechanical phase difference between the intervals of magnetic poles of the rotor and the intervals of stator teeth, the cogging torque, which is a torque ripple generated in the state where a current is not supplied, is reduced.

Further, in the synchronous motor 101, consecutive stator teeth belonging to a stator teeth group are arranged to have a phase difference of (π+π/9) electrical radians from each other. The stator coils wound around the stator teeth are supplied with currents with a phase difference of π/9 radians from each other. This maximizes the magnet torque generated between the stator teeth and the magnetic poles, on a tooth to tooth basis, whereby the total torque is increased. Furthermore, each stator tooth yields the maximum torque at different times, namely, with a time difference corresponding to a phase difference of π/9 radians from each other. As a result, the torque ripple having a primary cycle of π/3 radians can be cancelled out.

Note that in the description with reference to FIGS. 4 and 5, only the magnet torque generated by the permanent magnets is taken into consideration. Thus, the phases of currents are adjusted so as to maximize the current flowing to a stator coil when the center of the stator tooth and the point between magnetic poles of the rotor are aligned. However, the synchronous motor 101 is what is called an interior permanent magnet synchronous motor that has permanent magnets arranged inside the rotor core. Accordingly, the synchronous motor is able to utilize reluctance torque resulting from a difference in magneto-resistance, along with the magnet torque generated by the permanent magnets. It is in some cases possible to maximize the torque while utilizing both the magnet torque and the reluctance torque, by advancing the phases of the currents further than the cases shown in FIGS. 4A, 4B, 4C, 5A, 5B, and 5C.

Also, in the synchronous motor 101, concentrated winding is adopted for the stator coils on the stator teeth. Consequently, the coils at the end surfaces of the stator, i.e. coil ends, can be reduced in size, which contributes to downsizing of the synchronous motor. Additionally, the coil ends do not contribute to torque even during application of a current. By reducing the coil ends in size, a copper loss, which is a Joule heat loss due to resistance of the coils during the application of the current, can be reduced. As a result, a high efficiency is achieved.

Also, the synchronous motor 101 is so-called an outer rotor type where the rotor is placed outside the outer circumference of the stator. Consequently, assuming the volumes being the same, the diameter of the rotor may be longer than an inner rotor type structure where the stator is placed inside the inner circumference of the stator. Accordingly, even for the synchronous motor that has 20 poles, it is not necessary to reduce the size of the permanent magnets. This prevents a decline of the effective magnetic flux.

Furthermore, while the synchronous motor 101 has 20 rotor magnetic poles and 18 stator teeth, a synchronous motor with the following structure can achieve similar effects. The number of stator teeth is a multiple of nine such as 9 or 27, and the number of magnetic poles of the rotor is a multiple of 10, thereby constituting a combination of 10q poles and 9q teeth (q being a positive integer). This holds true with a combination of 8q poles and 9q teeth (q being a positive integer), and a combination of 10q poles and 12q teeth (q being a positive integer).

Furthermore, in the synchronous motor 101, the two stator teeth groups 108a and 108a' having a neutral point connection are arranged symmetrically about the axis. The two stator teeth groups 108b, and 108b' having a neutral point connection are arranged symmetrically about the axis. The two stator teeth groups 108c and 108c' having a neutral point connection are arranged symmetrically about the axis. Accordingly, the composite attraction in the radial direction caused by the stator teeth is 0, and no magnetic attraction force acts on the rotor. Consequently, the bearing life is not affected, whereby a longer operating life of the synchronous motor is achieved. Similarly, in a case of 30 poles and 27 teeth, three stator teeth groups having a neutral point connection are arranged at angular intervals of 120 mechanical degrees with respect to the axis. Accordingly, the composite attraction in the radial direction caused by the stator teeth when a current is applied to the coils is 0, and no magnetic attraction acts on the rotor.

As has been described so far, according to the first embodiment, a decrease in torque is suppressed, while the torque ripple is reduced. Thus, the synchronous motor drive system of compact size, high output, low vibration, low noise, and improved efficiency is provided.

Second Embodiment

<Synchronous Motor>

Figure 7:
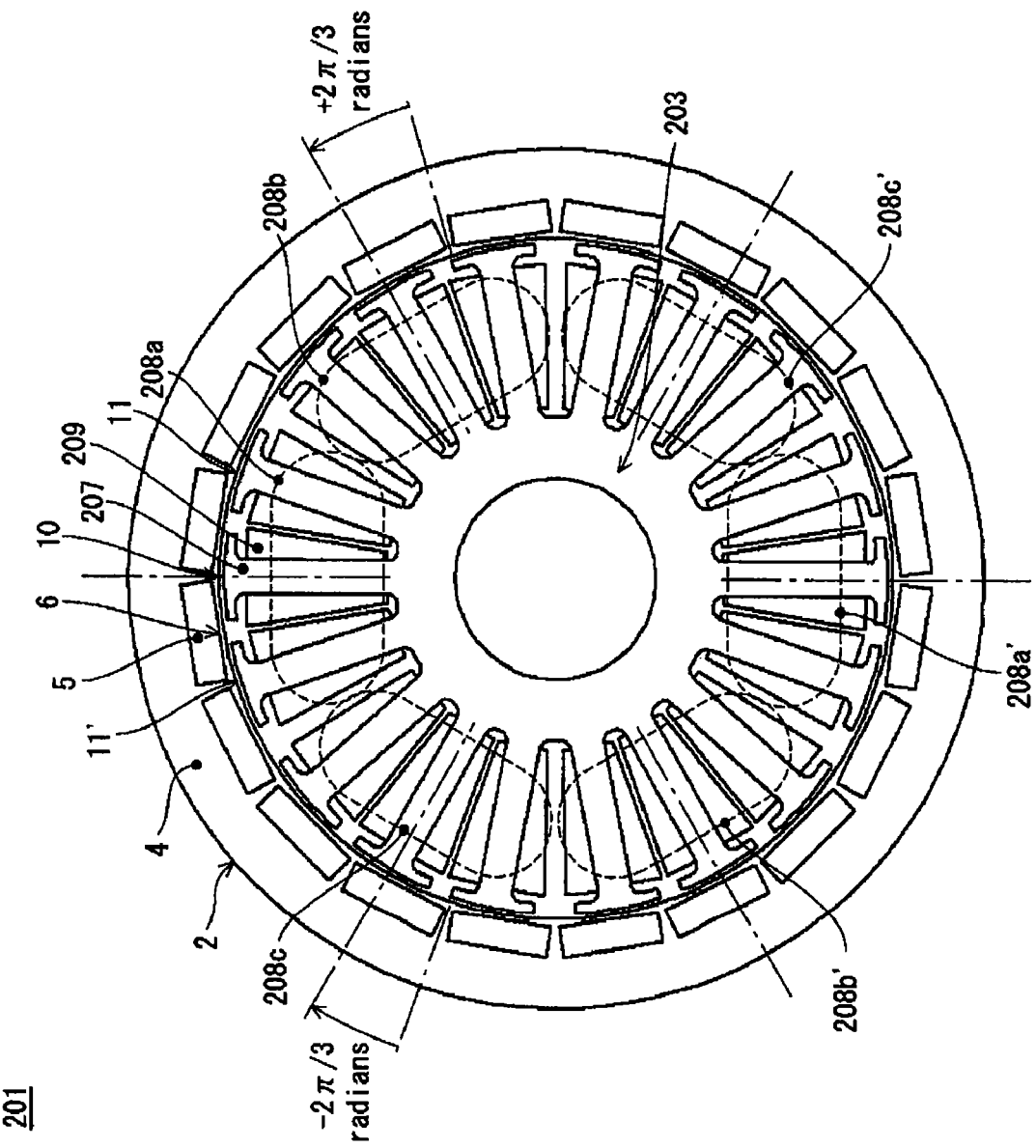
FIG. 7 is a plan view showing the synchronous motor included in the synchronous motor drive system pertaining to a second embodiment of the present invention.
Figure 8:
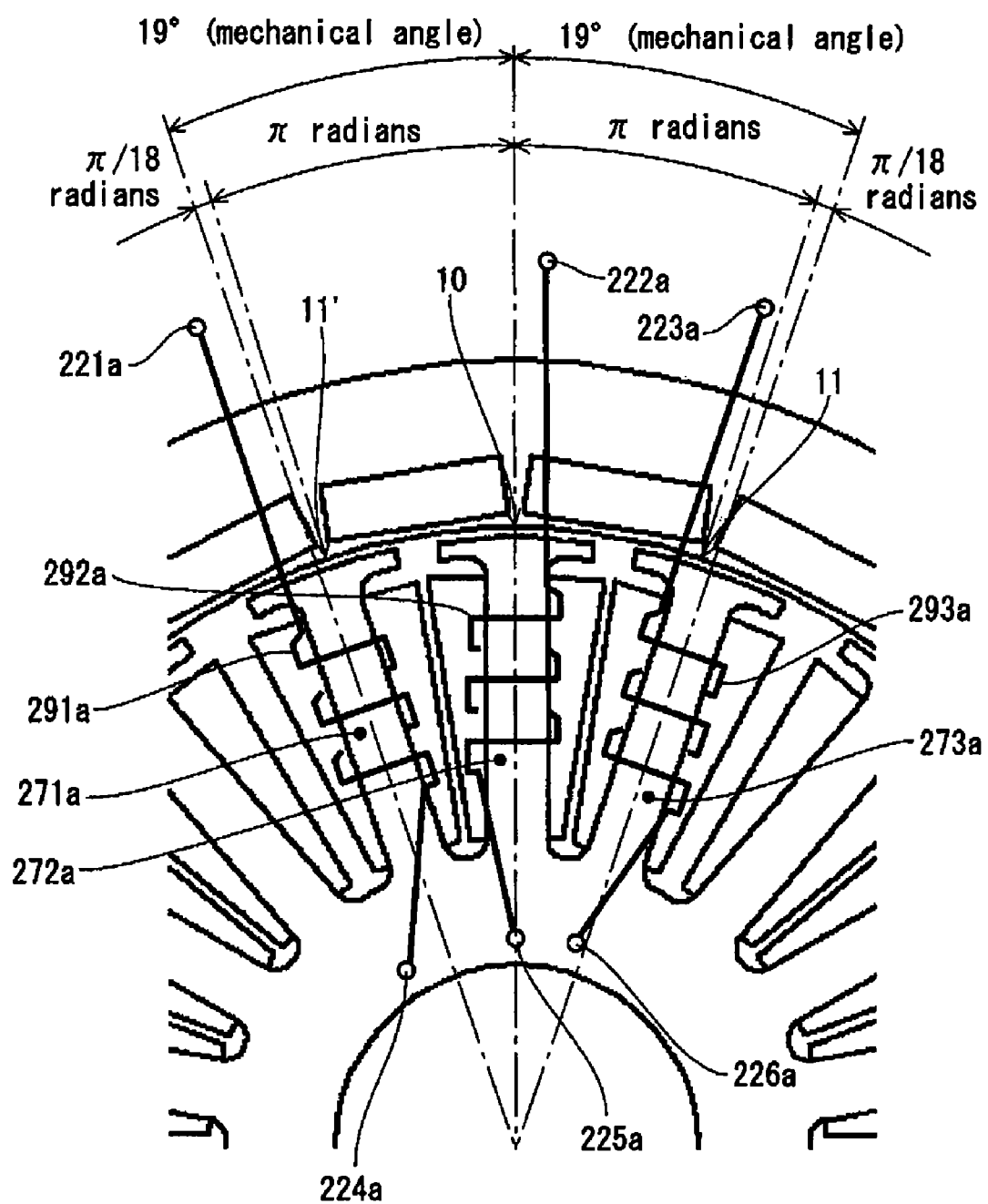
FIG. 8 is a detail view of the synchronous motor shown in FIG. 7.

FIG. 7 is a plan view showing the synchronous motor included in the synchronous motor drive system pertaining to a second embodiment of the present invention. FIG. 8 is a detail view of the synchronous motor shown in FIG. 7.

The synchronous motor 201 according to the second embodiment differs from the synchronous motor 101 according to the first embodiment with respect to the structure of a stator 203. Concretely, stator teeth 207 belonging to a stator teeth group 208 are arranged at different intervals.

The stator 203 includes a plurality of stator teeth 207 arranged diametrically opposite to the rotor 2. The stator 203 also includes stator coils 209 each wound around a stator tooth 207 by concentrated winding. Every M (where M=3 in the present embodiment) circumferentially consecutive stator teeth 207 belong to one of a plurality of stator teeth groups 208. In the present embodiment, there are six stator teeth groups 208 arranged at intervals of 60 mechanical degrees. Stator teeth groups 208a, 208b, and 208c are arranged at intervals of 2π/3 electrical radians.

FIG. 8 shows the structure of the stator teeth group 208a. This structure also applies to the stator teeth group 208b and the stator teeth group 208c.

The stator teeth group 208a is composed of three consecutive stator teeth 271a, 272a, and 273a. The stator teeth 271a, 272a, and 273a are respectively wound with the stator coils 291a, 292a, and 293a by concentrated winding such that the winding direction of each of the stator coils 291a, 292a, and 293a is alternately opposite to each other.

The stator tooth 271a is positioned at +19 mechanical degrees (i.e. with an additional offset of +π/18 radians besides an offset of π radians) with respect to the stator tooth 272a.

The stator tooth 273a is positioned at −19 mechanical degrees (i.e. with an additional offset of −π/18 radians besides an offset of π radians) with respect to the stator tooth 272a.

Figure 9:
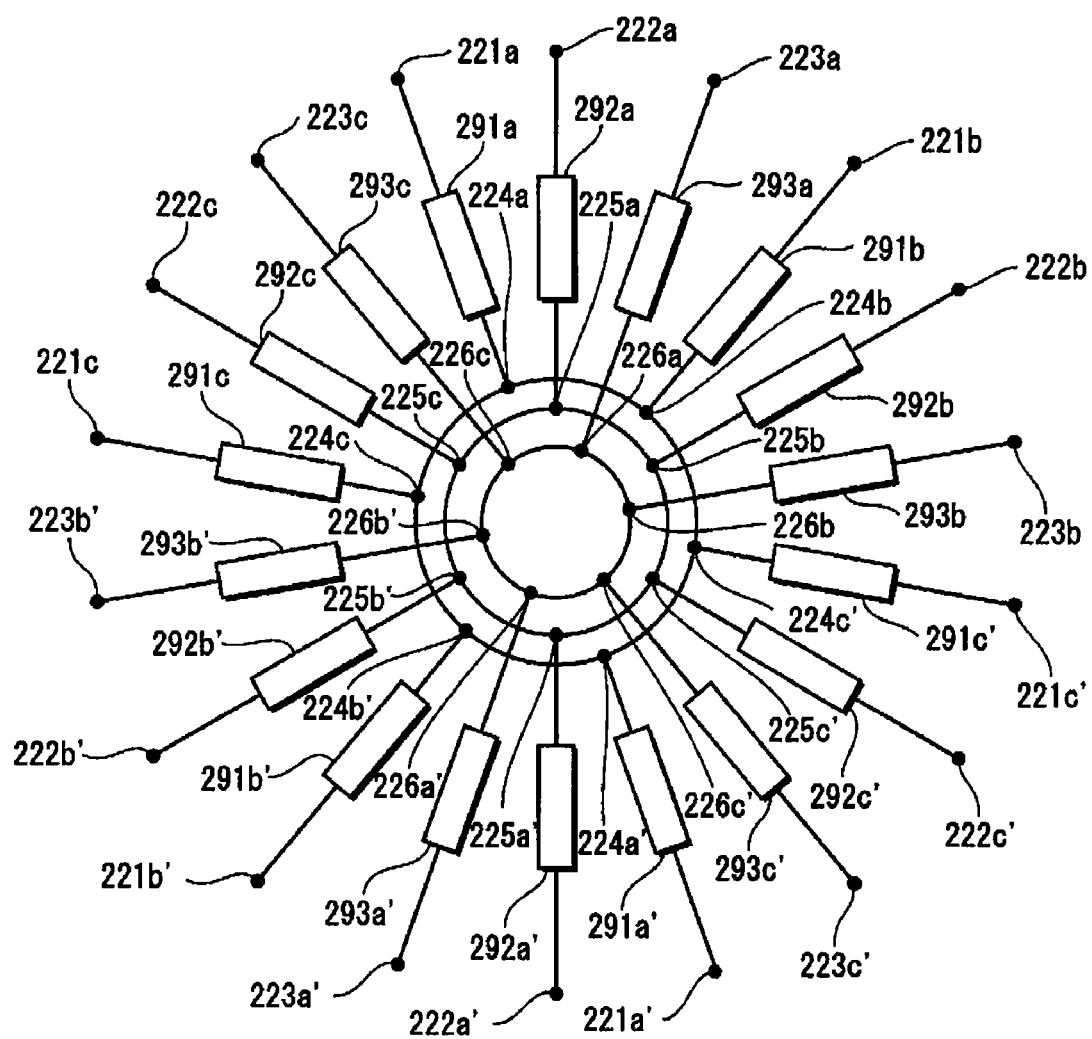
FIG. 9 is a view illustrating stator coil connections of the synchronous motor shown in FIG. 7.

FIG. 9 is a view illustrating stator coil connections of the synchronous motor shown in FIG. 7.

The alphabetical letters a, b, and c following the reference signs of the stator coil terminals shown in the figure correspond to coils belonging to the stator teeth groups 208a, 208b, and 208c, respectively.

Like the first embodiment, in the second embodiment also, the three stator coils 291a, 292a, and 293a belonging to the stator teeth group 208a respectively have coil terminals 221a, 222a, and 223a. The coil terminals 221a, 222a, and 223a extend outside to be connected to separate connection terminals of inverters (i.e. motor drivers). The stator coil terminals in different stator teeth groups 208a, 208b, and 208c are connected to common neutral points in a manner such that the connected terminals have a phase difference of 2π/3 radians with each other.

<Driving Method>

Next, a description is given of a method for driving the synchronous motor 201.

Figure 11:
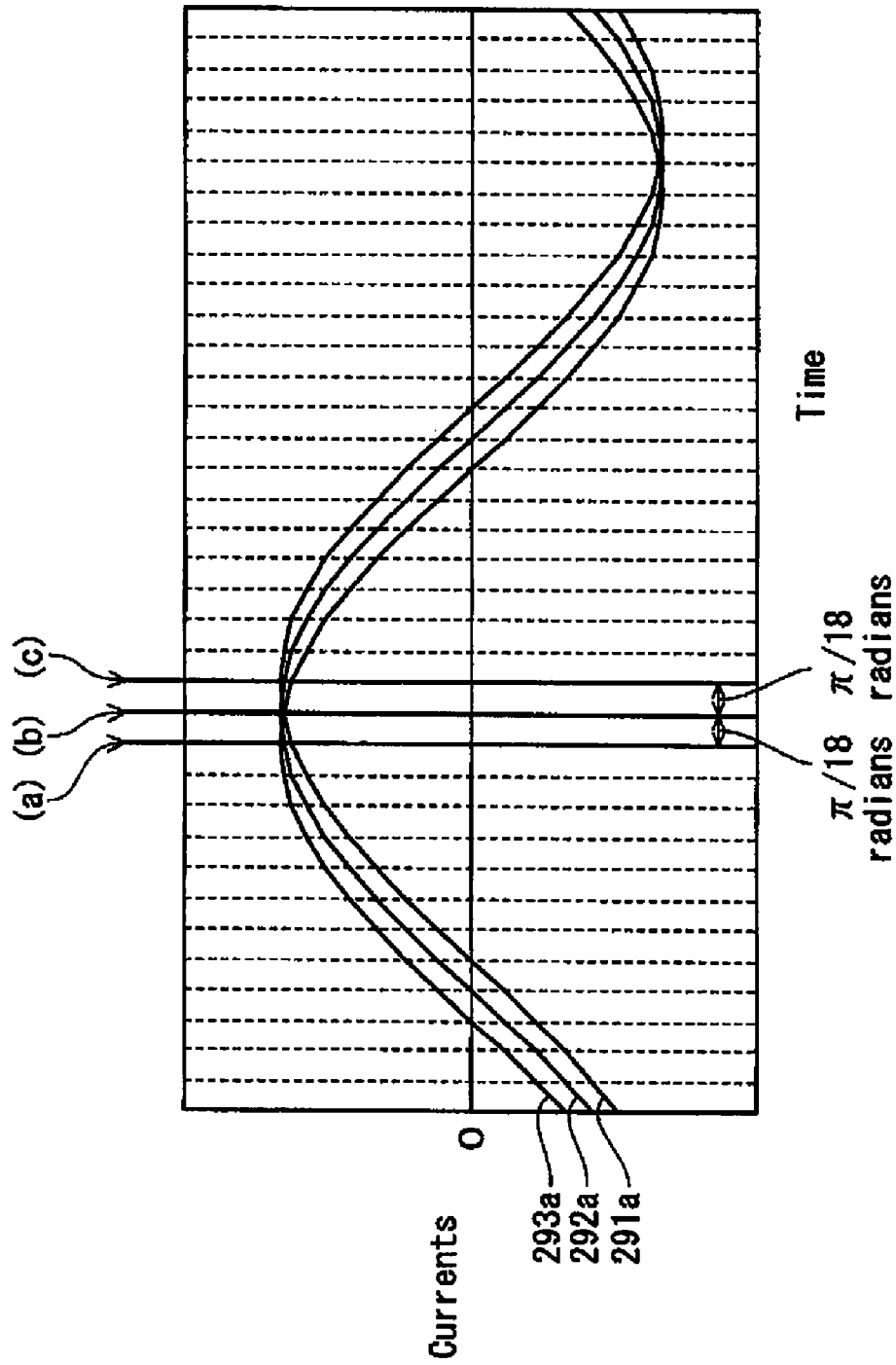
FIG. 11 shows temporal transitions of currents supplied to stator coils in the second embodiment.

FIGS. 10A, 10B, and 10C show positional relations between a stator and a rotor pertaining to the second embodiment of the present invention. FIG. 10A shows the positional relation in a certain state. FIG. 10B shows the positional relation in the state in which the rotor 2 has been rotated by 1 mechanical degree (i.e. π/18 electrical radians) anti-clockwise from the state shown in FIG. 10A. FIG. 10C shows the positional relation in the state in which the rotor 2 has been rotated by 1 mechanical degree (i.e. π/18 electrical radians) anti-clockwise from the state shown in FIG. 10B. FIG. 11 shows currents supplied to the stator coils shown in FIGS. 10A, 10B, and 10C. Time points shown as (a), (b), and (c) in FIG. 11 correspond to the positional relations shown in FIGS. 10A, FIG. 10B, and FIG. 10C, respectively.

In the positional relation shown in FIG. 10A, the center of the stator tooth 273a and the point 11 between magnetic poles of the rotor are aligned, as indicated by the chain line. On the other hand, the center of the stator tooth 272a and the point 10 between magnetic poles of the rotor are not aligned. Also, the center of the stator tooth 271a and the point 11' between magnetic poles of the rotor are not aligned This is because that an angle (i.e. 18 mechanical degrees) between two consecutive poles of the rotor is different from an angle (i.e. 19 mechanical degrees) between two consecutive stator teeth, as described with reference to FIG. 8. In the positional relation shown in FIG. 10A, it is possible to maximize magnet torque generated between the stator tooth 273a and the magnetic poles, by supplying currents while adjusting the current phases so as to maximize the current flowing to the stator coil 293a.

FIG. 10B shows the positional relation in the state in which the rotor has been rotated by 1 mechanical degree (i.e. π/18 electrical radians) anti-clockwise from the state shown in FIG. 10A. In the positional relation shown in FIG. 10B, the center of the stator tooth 272a and the point 10 between magnetic poles of the rotor are aligned, as indicated by the chain line. On the other hand, the center of the stator tooth 273a and the point 11 between magnetic poles of the rotor are not aligned. Also, the center of the stator tooth 271a and the point 11' between magnetic poles of the rotor are not aligned In the positional relation shown in FIG. 10B, it is possible to maximize magnet torque generated between the stator tooth 272a and the magnetic poles, by supplying currents while adjusting the current phases so as to maximize the current flowing to the stator coil 292a.

FIG. 10C shows the positional relation in the state in which the rotor has been rotated by 1 mechanical degree (i.e. π/18 electrical radians) anti-clockwise from the state shown in FIG. 10B. In the positional relation shown in FIG. 10C, the center of the stator tooth 271a and the point 11' between magnetic poles of the rotor are aligned, as indicated by the chain line. On the other hand, the center of the stator tooth 273a and the point 11 between magnetic poles of the rotor are not aligned. Also, the center of the stator tooth 272a and the point 10 between magnetic poles of the rotor are not aligned. In the positional relation shown in FIG. 10C, it is possible to maximize magnet torque generated between the stator tooth 271a and the magnetic poles, by supplying currents while adjusting the current phases so as to maximize the current flowing to the stator coil 291a.

FIG. 11 shows temporal transitions of currents applied to the stator coils 291a, 292a, and 293a. FIG. 11 shows temporal transitions of currents supplied to the stator coils 291a, 292a, and 293a. With respect to the current supplied to the stator coil 292a, the current supplied to the stator coil 293a is advanced by π/18 radians. On the other hand, with respect to the current supplied to the stator coil 292a, the current supplied to the coil terminal 291a is delayed by π/18 radians.

As mentioned above, in each of the positional relations shown in FIG. 10A, FIG. 10B, and FIG. 10C, the phases of the currents flowing to the respective stator coils are adjusted so as to maximize the magnet torque generated between the stator coils and the magnetic poles. Accordingly, the overall torque is increased.

Between the arrangement of the stator coils and the currents supplied to the stator coils, the following relation is satisfied.

With respect to the stator coil 292a, the stator tooth 293a is arranged with an additional offset of −π/18 radians besides an offset of π electrical radians. Regarding such an arrangement relation, with respect to the current supplied to the stator coil 292a, the current supplied to the stator coil 293a is advanced by π/18 radians. On the other hand, with respect to the stator coil 292a, the coil 291a is arranged with an additional offset of +π/18 radians besides an offset of π electrical radians. Regarding such an arrangement relation, with respect to the current supplied to the stator coil 292a, the current supplied to the stator coil 291a is delayed by π/18 radians. This maximizes the current flowing to a stator coil wound around a stator tooth in the positional relation in which the center of the stator tooth and a point between magnetic poles of the rotor are aligned.

As mentioned above, the synchronous motor 201 has six stator teeth groups arranged at equal intervals. Three stator teeth belong to each stator teeth group, and these stator teeth are arranged at equal intervals. However, note that not all of 18 stator teeth are arranged at equal intervals. In this way, simply by arranging the stator teeth such that the stator teeth have slight phase differences with each other, and by supplying currents with slight phase differences to the stator teeth in accordance with the differences in arrangement, torque ripples is reduced, while a decrease in torque is suppressed. Thus, the synchronous motor drive system of compact size, high output, low vibration, low noise, and improved efficiency is provided.

Third Embodiment

FIG. 12 is a detail view showing the synchronous motor included in the synchronous motor drive system pertaining to a third embodiment of the present invention.

The third embodiment differs from the second embodiment in that winding directions of the stator coils each wound around the respective stator teeth are identical to each other.

Figure 12A:
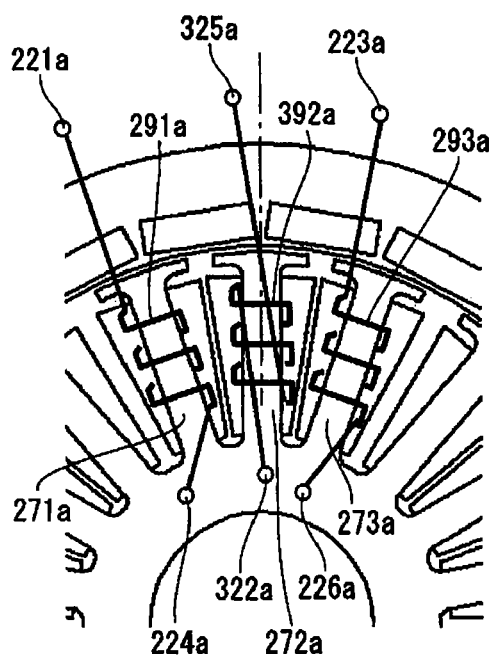
FIGS. 12A and 12B are detail views showing the synchronous motor included in the synchronous motor drive system pertaining to a third embodiment of the present invention.

In the example shown in FIG. 12A, the stator coils 291a, 392a, and 293a are wound around the stator teeth 271a, 272a, and 273a. The winding directions of the stator coils 291a, 392a, and 293a are identical to each other.

Now, it is assumed that the winding of the stator coils 291a, 392a, and 293a starts at terminals 221a, 322a, and 223a and end at terminals 224a, 325a, and 226a, respectively. As for the stator coils 291a and 293a, the terminals 221a and 223a at which the winding starts serve as input terminals, and the terminals 224a and 226a at which the winding ends serve as neutral point terminals. This is the same as for the second embodiment. However, as for the stator coil 392a, the terminal 325a at which the winding ends serves as an input terminal, and the terminal 322a at which the winding starts serves as a neutral point terminal.

As is the case in the second embodiment, the stator coils 291a, 392a, and 293a are supplied with the currents shown in FIG. 11. As a result, two consecutive stator coils generate magnet fields having opposite polarities.

Figure 12B:
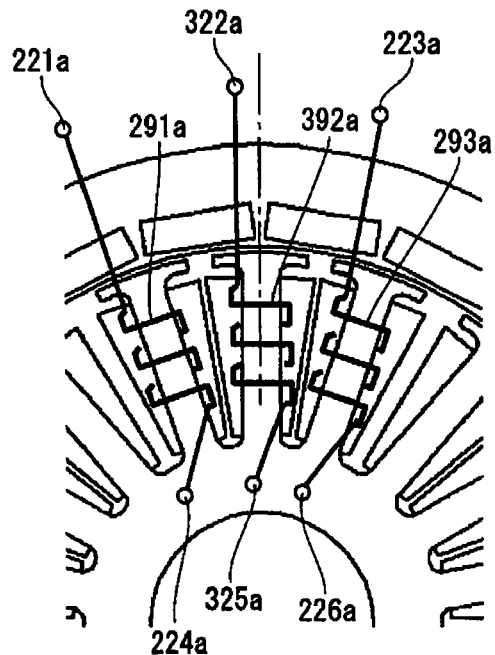

In the example shown in FIG. 12B, the winding directions of the stator coils 291a, 392a, and 293a are identical to each other. Now, it is assumed that the winding of the stator coils 291a, 392a, and 293a starts at terminals 221a, 322a, and 223a and end at terminals 224a, 325a, and 226a, respectively. In all the stator coils 291a, 392a, and 293a, the terminals 221a, 322a, and 223a at which the winding starts serve as input terminals, and the terminals 224a, 325a, and 226a at which the winding ends serve as neutral point terminals, respectively.

Figure 13:
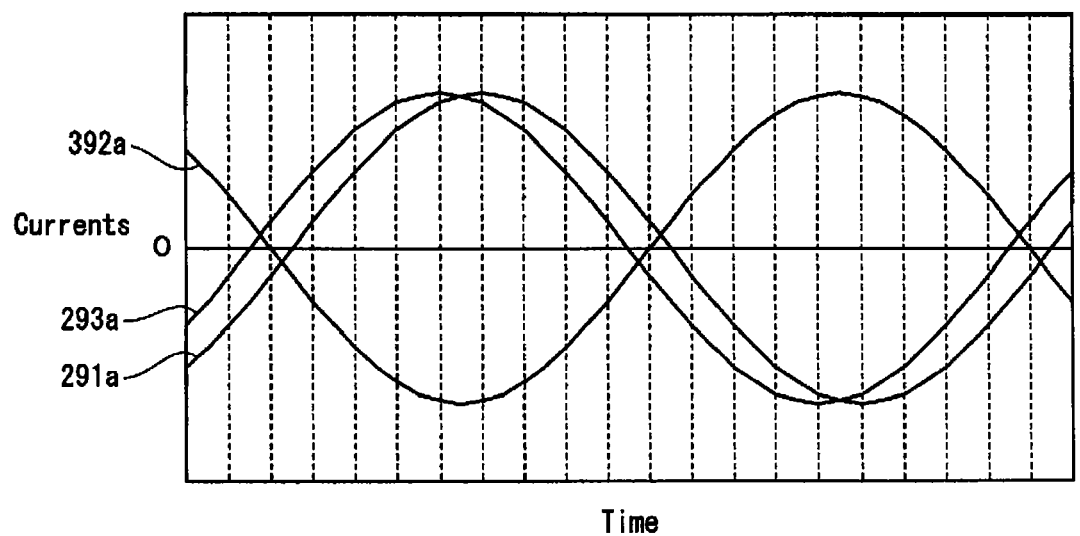
FIG. 13 shows temporal transitions of currents supplied to stator coils shown in FIG. 12B.

FIG. 13 shows temporal transitions of currents supplied to the stator coils shown in FIG. 12B. As shown in FIG. 13, the phase of the current supplied to the stator coil 392a is opposite relative to the current supplied to the stator coil 292a shown in FIG. 11. As a result, two consecutive stator coils generate magnet fields having opposite polarities As has been described, according to the third embodiment, a decrease in torque is suppressed, while the torque ripple is reduced. Further, the winding directions of the stator coils are made identical to each other in the manufacturing processes, whereby manufacturing variability in the stator coils is reduced. Thus, a reliable synchronous motor drive system is provided. Meanwhile, although the third embodiment is described as a modification of the second embodiment, this is not limiting. The third embodiment can be applied to the first embodiment as well.

Fourth Embodiment

A fourth embodiment is the same as the first embodiment with respect to the structure of the synchronous motor. Specifically, three stator teeth of each stator teeth group are arranged with additional offsets of π/9 radians besides offsets of it radians. In the fourth embodiment, the phase of the current supplied to each stator coil differs from the first embodiment. A description is given below of the current application method in the fourth embodiment.

Figure 14:
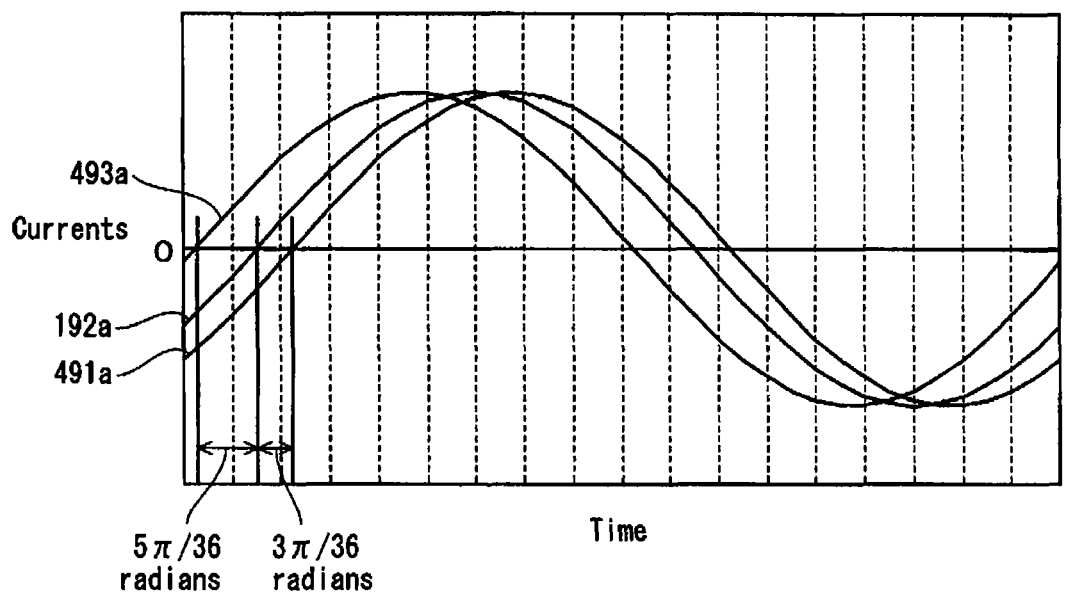
FIG. 14 shows temporal transitions of currents supplied to stator coils in a fourth embodiment.

FIG. 14 shows temporal transitions of currents applied to the stator coils in the fourth embodiment of the present invention.

As shown in FIG. 14, the current supplied to the stator coil 493a and the current supplied to the stator coil 491a are out of phase by 2π/9 radians. This is the same as the first embodiment. However, with respect to the current supplied to the stator coil 192a, the current supplied to the stator coil 493a is advanced by 5π/36 radians. Further, with respect to the current supplied to the stator coil 192a, the current supplied to the stator coil 491a is delayed by 3π/36 radians. These points distinguish the second embodiment from the first embodiment. In this way, even when there are phase differences between the currents supplied to the stator coils wound around three stator teeth arranged in a stator teeth group at equal intervals, the synchronous motor yield increased torque, while decreasing the torque ripple, compared with motors using conventional technology. Meanwhile, although the fourth embodiment is described as a modification of the first embodiment, the fourth embodiment can also be applied to the second embodiment.

Torque Measurement Results

A description is given below of torque obtained in a conventional synchronous motor drive system, the synchronous motor drive system of the first embodiment, and the synchronous motor drive system of the fourth embodiment.

Figure 15:
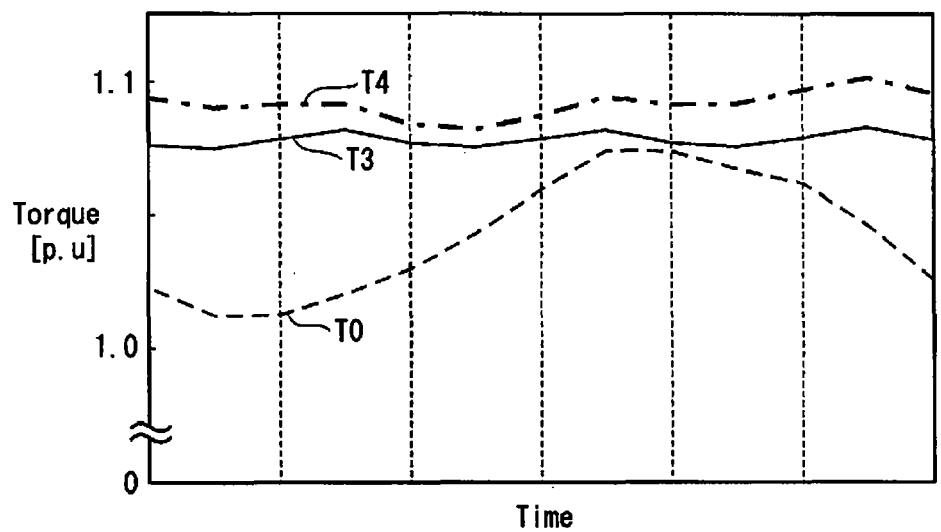
FIG. 15 shows temporal transitions of torque.

FIG. 15 shows temporal transitions of torque.

The line represented by T0 indicates temporal transitions of torque in a conventional synchronous motor drive system. The line T3 indicates temporal transitions of torque in the synchronous motor drive system of the first embodiment. The line T4 indicates temporal transitions of torque in the synchronous motor drive system of the fourth embodiment.

Figure 16:
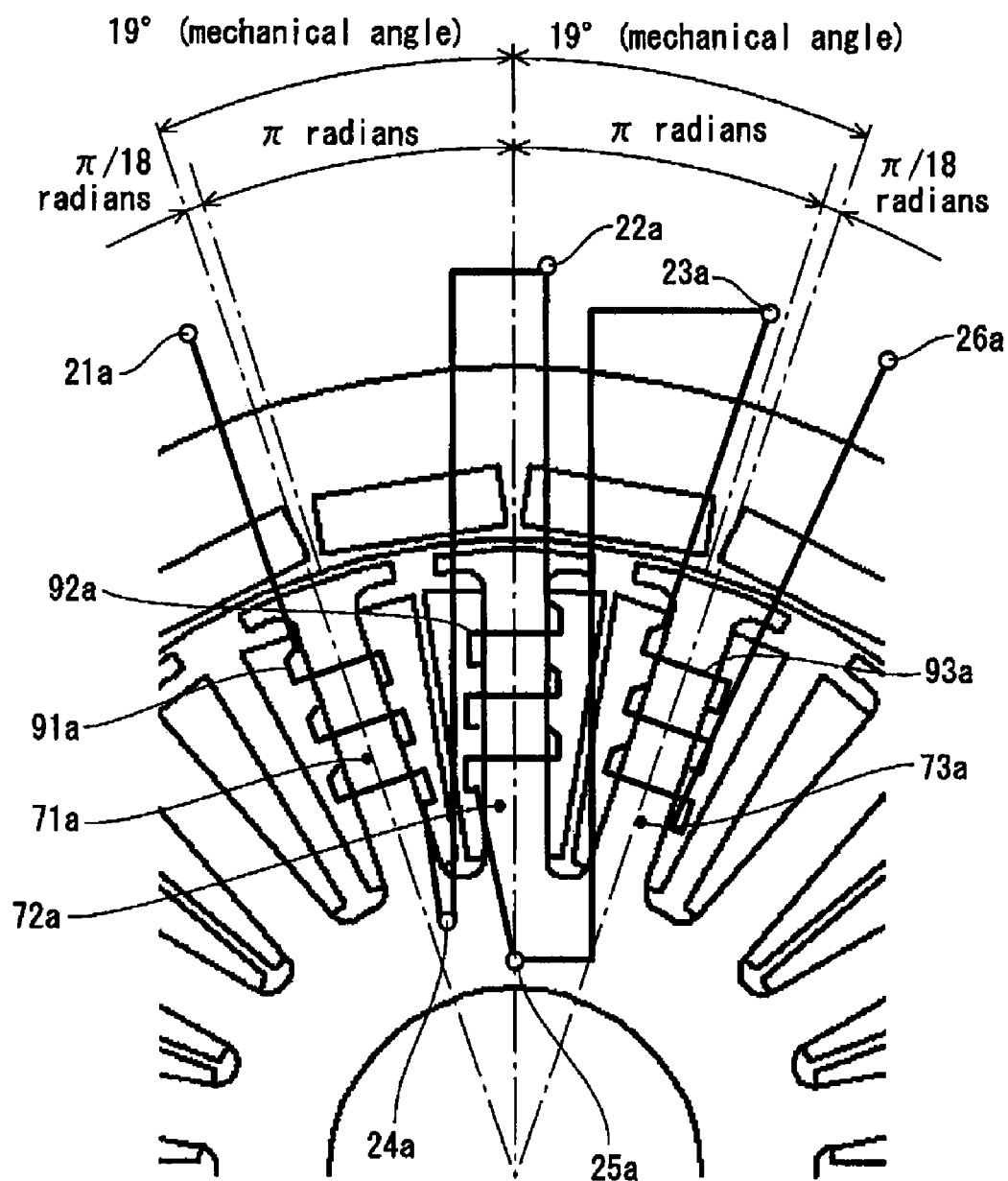
FIG. 16 is a detail view of a conventional synchronous motor.

A description is first given of a conventional synchronous motor drive system. FIG. 16 is a detail view of a conventional synchronous motor. In this description, the structure disclosed in Patent Literature 2 (Japanese patent application publication No. 2003-244915) is applied.

In the conventional synchronous motor, the stator coils 91a, 92a, and 93a are connected in series. Specifically, the coil terminal 24a of the stator coil 91a and the coil terminal 22a of the stator coil 92a are connected with each other. The coil terminal 25a of the stator coil 92a and the coil terminal 23a of the stator coil 93a are connected with each other. As a result, the coil terminal 21a of the stator coil 91a serves as an input terminal, and the coil terminal 26a of the stator coil 93a serves as a neutral point terminal.

Figure 17:
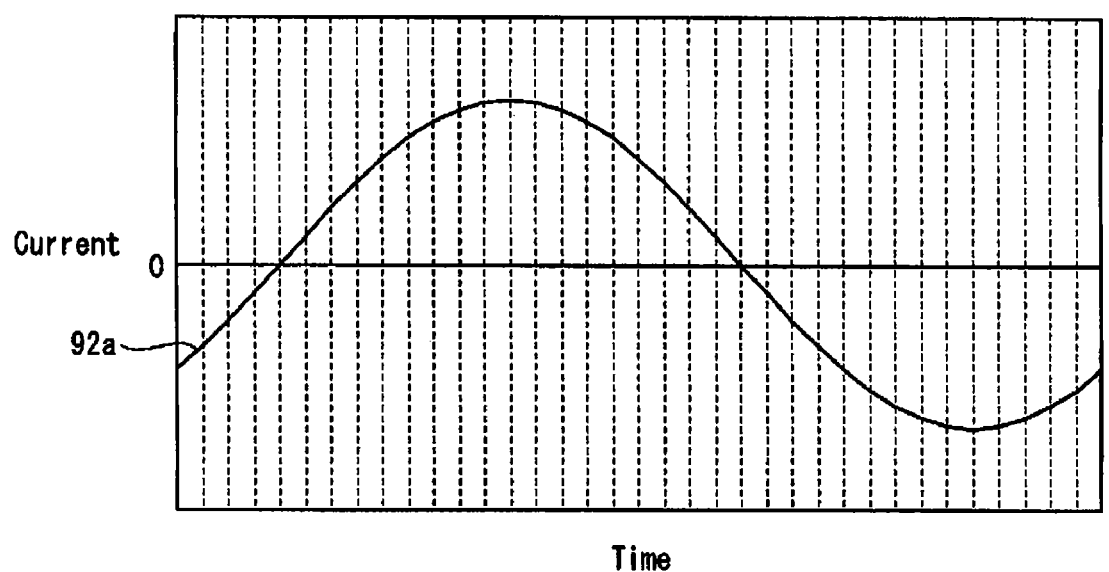
FIG. 17 shows temporal transitions of currents supplied to stator coils in the conventional synchronous motor.

FIG. 17 shows temporal transitions of currents applied to the stator coils in the conventional synchronous motor. For example, consider a positional relation where the center of the stator tooth 72a and the point 10 between magnetic poles of the rotor are aligned. In this positional relation, it is possible to maximize magnet torque generated between the stator tooth 72a and the magnetic poles, by supplying currents while adjusting the current phases so as to maximize the current flowing to the stator coil 92a. However, in this positional relation, the center of the stator tooth 71a and the point 11' between magnetic poles of the rotor are not aligned. The center of the stator tooth 73a and the point 11 between magnetic poles of the rotor are not aligned, either. Accordingly, it is not possible to maximize magnet torque generated between the stator tooth 71a and the magnetic poles. It is not possible to maximize magnet torque generated between the stator tooth 73a and the magnetic poles, either.

As shown in FIG. 15, the average torque obtained in the first embodiment and that obtained in the fourth embodiment are higher than that obtained in the conventional structure. Further, the torque ripple represented by a ratio of a difference between maximum torque and minimum torque to average torque is approximately 6% according to the conventional technology. On the other hand, the torque ripple is lower than 1% in the first embodiment of the present invention. It is approximately 1% in the fourth embodiment.

As has been described so far, according to the present embodiment of the present invention, a decrease in torque is suppressed, while the torque ripple is reduced. Thus, the synchronous motor drive system of compact size, high output, low vibration, low noise, and improved efficiency is provided.

Fifth Embodiment

<Synchronous Motor>

Figure 18:
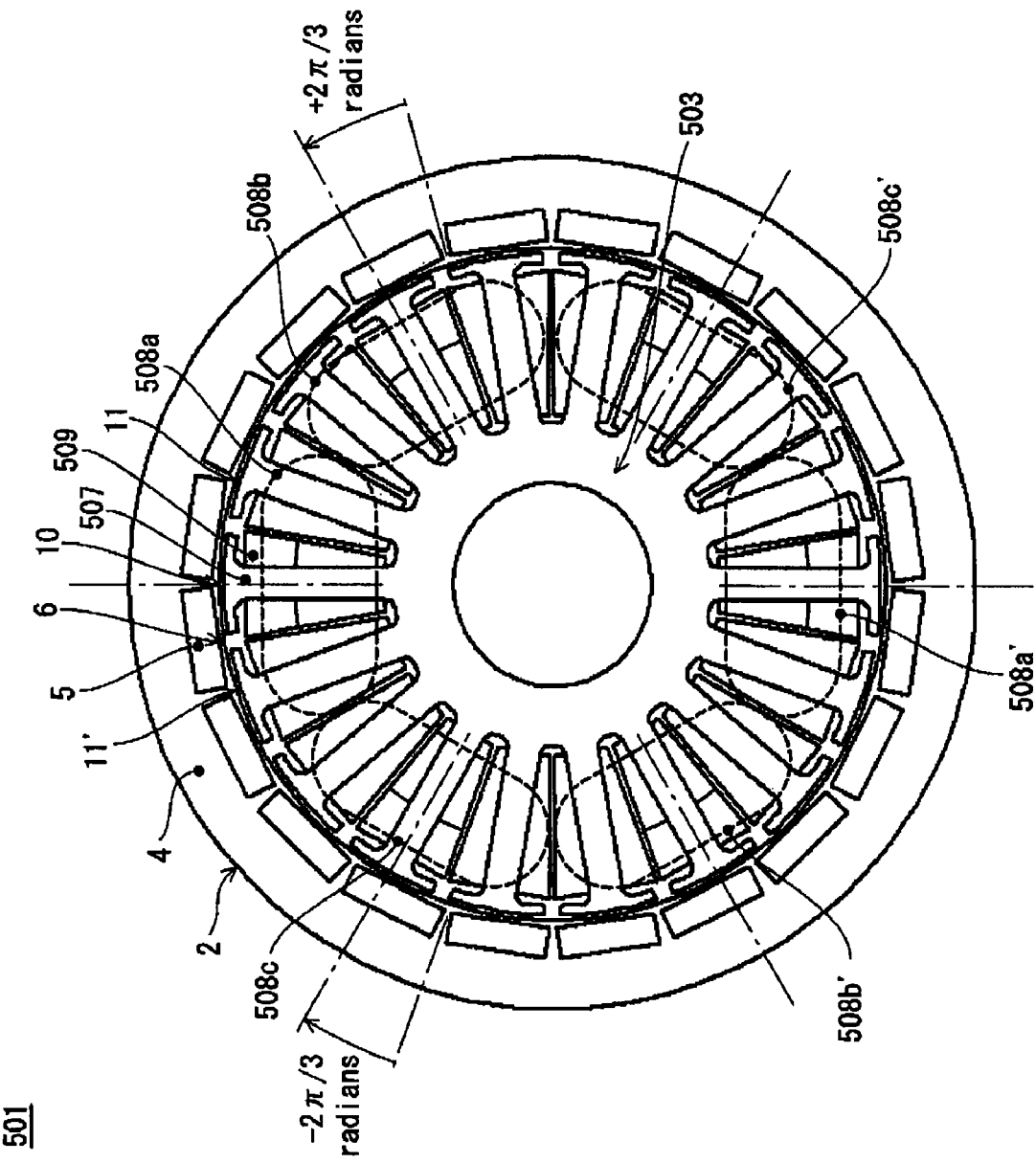
FIG. 18 is a plan view showing the synchronous motor included in the synchronous motor drive system pertaining to a fifth embodiment of the present invention.
Figure 19:
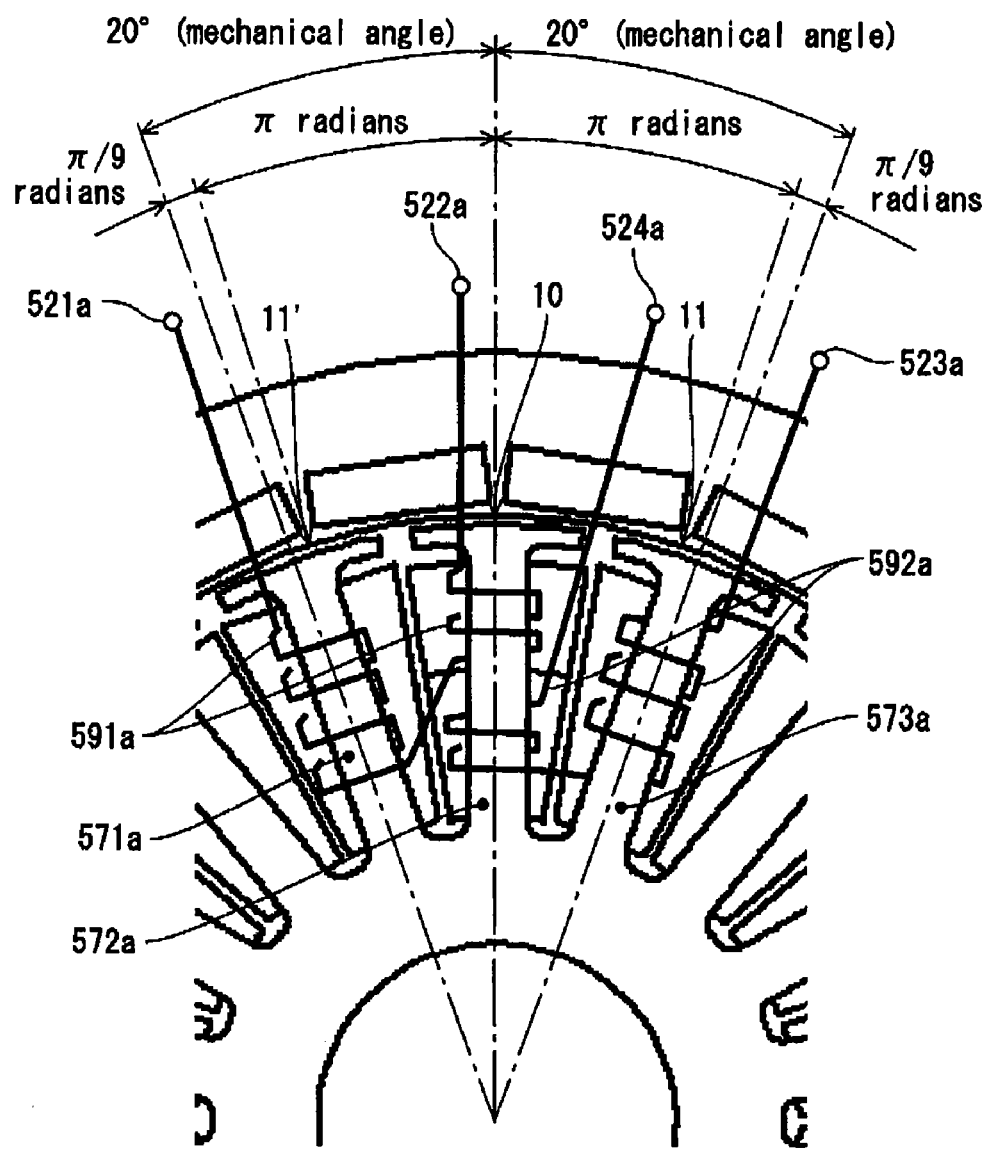
FIG. 19 is a detail view of the synchronous motor shown in FIG. 18.

FIG. 18 is a plan view showing the synchronous motor included in the synchronous motor drive system pertaining to a fifth embodiment of the present invention. FIG. 19 is a detail view of the synchronous motor shown in FIG. 18.

A synchronous motor 501 of the fifth embodiment differs from the synchronous motor 101 of the first embodiment with respect to the structure of stator coils 509.

The stator 503 includes a plurality of stator teeth 507 arranged diametrically opposite to the rotor 2, and stator coils 509 each wound around a stator tooth 507 by concentrated winding. Every M (where M=3 in the present embodiment) circumferentially consecutive stator teeth belong to one of a plurality of stator teeth groups 508. In the present embodiment, there are six stator teeth groups 508 arranged at intervals of 60 mechanical degrees. Stator teeth groups 508a, 508b, and 508c are arranged at intervals of 2π/3 electrical radians.

With reference to FIG. 19, a description is given in details of the structure of the stator teeth group 508a. The stator teeth group 508a is composed of three consecutive stator teeth 571a, 572a, and 573a. The stator teeth 571a, 572a, and 573a are arranged in a manner identical to the stator teeth 171a, 172a, and 173a of the first embodiment.

The stator tooth 571a is wound with a part of stator coil 591a (having N1 number of turns). The stator tooth 573a is wound with a part of stator coil 592a (having N2 number of turns). The stator tooth 572a is wound with the remaining part of the stator coil 591a (having N21 number of turns) and the remaining part of the stator coil 592a (having N22 number of turns).

The stator coil 591a is wound around both the stator tooth 571a and the stator tooth 572a, causing the two wound parts to generate magnetic fields having polarities opposite to each other. Similarly, the stator coil 592a is wound around both the stator tooth 572a and the stator tooth 573a, causing the two wound parts to generate magnetic fields having polarities opposite to each other. Further, when the stator coils 591a and 592a are supplied with currents having the same phase, the two parts in the stator tooth 572a wound with the stator coils 591a and 592a generate magnet fields having the same polarity.

Regarding the number of turns of the stator coils 591a and 592a, the following relations are satisfied.

$$N1=N2$$

$$N21=N22=(N1)/\{2\cos(\pi/9)\}$$

With the above relations satisfied, the maximum flux values obtained in the stator teeth 571a, 572a, and 573a are equalized. Although in this description the equal signs = are used for convenience, it is often difficult to equalize actual values perfectly. Accordingly, the equal signs on the above include equality even to the extent that, if right-hand side becomes a decimal, the nearest integer to the decimal can be adapted. Furthermore, the equal signs include equality within a range of an ignorable degree of design errors. The same applies to other formulas.

Figure 20:
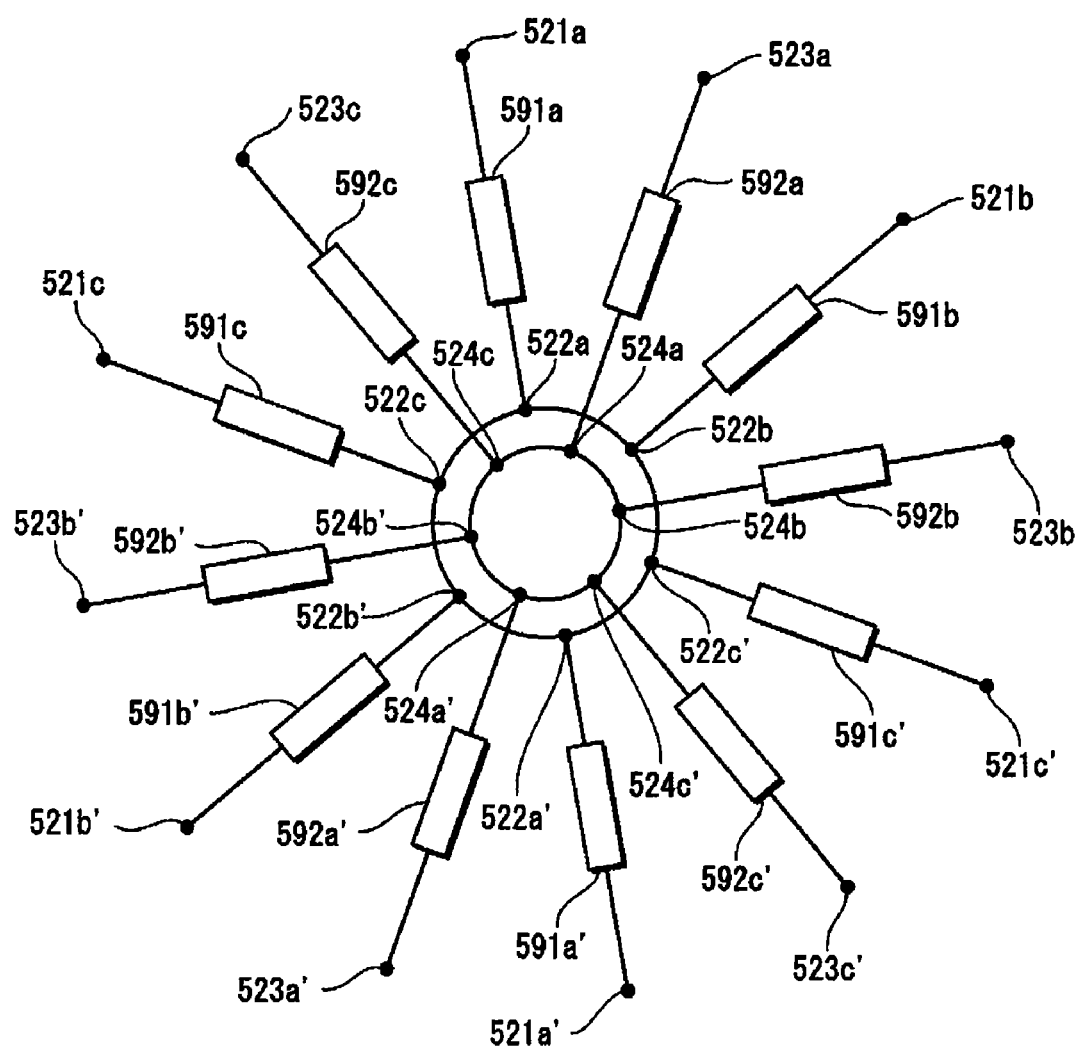
FIG. 20 is a view illustrating stator coil connections of the synchronous motor shown in FIG. 18.

FIG. 20 is a view illustrating stator coil connections of the synchronous motor shown in FIG. 18.

The alphabetical letters a, b, and c following the reference signs of the stator coil terminals shown in the figure correspond to coils belonging to the stator teeth groups 508a, 508b, and 508c, respectively.

The two stator coils 591a and 592a belonging to the stator teeth group 508a respectively have coil terminals 521a and 523a. The coil terminals 521a and 523a extend outside to be connected to separate connection terminals of the inverters (i.e. motor drivers). Similarly, the two coil terminals 521b and 523b in the stator teeth group 508b extend outside to be connected to separate connection terminals of the inverters (i.e. motor drivers). The two coil terminals 521c and 523c in the stator teeth group 508c extend outside to be connected to separate connection terminals of the inverters (i.e. motor drivers).

In this way, the stator coil terminals in different stator teeth groups 508a, 508b, and 508c are connected to common neutral points in a manner such that the connected terminals have a phase difference of 2π/3 radians with each other. More specifically, coil terminals 522a, 522b, and 522c are connected to the first neutral point. Coil terminals 524a, 524b, and 524c are connected to the second neutral point.

<Driving Method>

Next, a description is given of a method for driving the synchronous motor 501.

Figure 22:
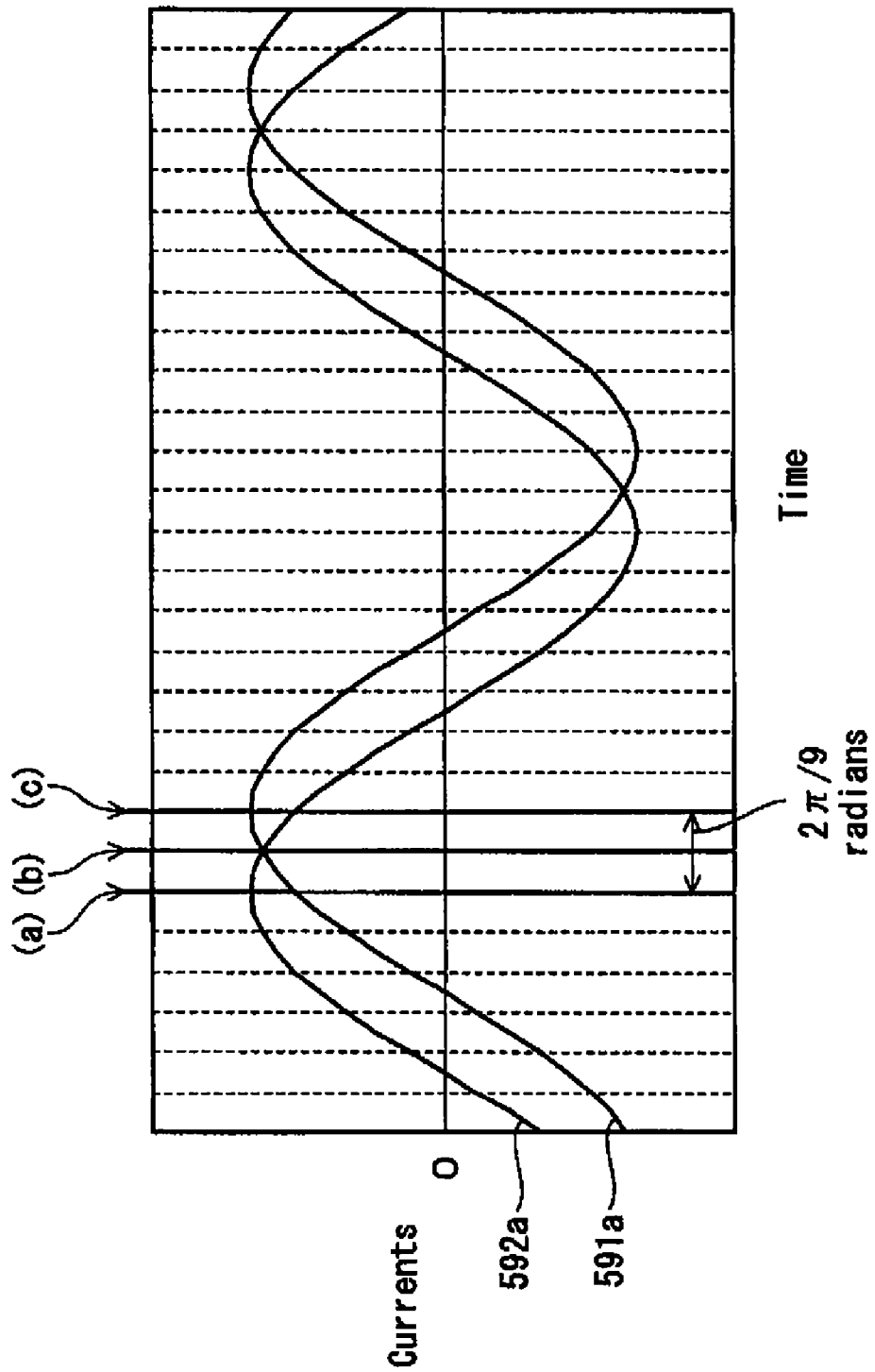
FIG. 22 shows temporal transitions of currents supplied to stator coils in the fifth embodiment.

FIGS. 21A, 21B, and 21C show positional relations between a stator and a rotor pertaining to the fifth embodiment of the present invention. FIG. 21A shows the positional relation in a certain state. FIG. 21B shows the positional relation in the state in which the rotor 2 has been rotated by 2 mechanical degrees (i.e. π/9 electrical radians) anti-clockwise from the state shown in FIG. 21A. FIG. 21C shows the positional relation in the state in which the rotor 2 has been rotated by 2 mechanical degrees (i.e. π/9 electrical radians) anti-clockwise from the state shown in FIG. 10B. FIG. 22 shows currents supplied to the stator coils shown in FIGS. 21A, 21B, and 21C. Time points shown as (a), (b), and (c) in FIG. 22 correspond to the positional relations shown in FIG. 21A, FIG. 21B, and FIG. 21C, respectively.

In the positional relation shown in FIG. 21A, the center of the stator tooth 573a and the point 11 between magnetic poles of the rotor are aligned, as indicated by the chain line. On the other hand, the center of the stator tooth 572a and the point 10 between magnetic poles of the rotor are not aligned. Also, the center of the stator tooth 571a and the point 11' between magnetic poles of the rotor are not aligned. In the positional relation shown in FIG. 21A, it is possible to maximize magnet torque generated between the stator tooth 573a and the magnetic poles, by supplying currents while adjusting the current phases so as to maximize the current flowing to the stator coil 592a.

FIG. 21B shows the positional relation in the state in which the rotor has been rotated by 2 mechanical degrees (i.e. π/9 electrical radians) anti-clockwise from the state shown in FIG. 21A. In the positional relation shown in FIG. 21B, the center of the stator tooth 572a and the point 10 between magnetic poles of the rotor are aligned, as indicated by the chain line. On the other hand, the center of the stator tooth 573a and the point 11 between magnetic poles of the rotor are not aligned. Also, the center of the stator tooth 571a and the point 11' between magnetic poles of the rotor are not aligned. The numbers of turns of the stator teeth 591a and 592a are adjusted so that vector synthesis of the currents supplied to the stator coils 591a and 592a is maximized in the positional relation shown in FIG. 21B. As a result, it is possible to maximize magnet torque generated between the stator tooth 572a and the magnetic poles.

FIG. 21C shows the positional relation in the state in which the rotor has been rotated by 2 mechanical degree (i.e. π/9 electrical radians) anti-clockwise from the state shown in FIG. 21B. In the positional relation shown in FIG. 21C, the center of the stator tooth 571a and the point 11' between magnetic poles of the rotor are aligned, as indicated by the chain line. On the other hand, the center of the stator tooth 573a and the point 11 between magnetic poles of the rotor are not aligned. Also, the center of the stator tooth 572a and the point 10 between magnetic poles of the rotor are not aligned. In the positional relation shown in FIG. 21C, it is possible to maximize magnet torque generated between the stator tooth 571a and the magnetic poles, by supplying currents while adjusting the current phases so as to maximize the current flowing to the stator coil 591a.

FIG. 22 shows temporal transitions of currents supplied to the stator coils 591a and 592a. With respect to the current supplied to the stator coil 591a, the current supplied to the stator coil 592a is advanced by 2π/9 radians.

As mentioned above, in each of the positional relations shown in FIG. 21A, FIG. 21B, and FIG. 21C, the current phases of the currents flowing to the respective stator coils and the numbers of turns of the stator coils are adjusted so as to maximize the magnet torque generated between the stator coils and the magnetic poles. Accordingly, the overall torque is increased.

Between the arrangement of the stator coils and the currents supplied to the stator coils, the following relation is satisfied.

With respect to the stator teeth 572a, the stator tooth 573a is arranged with an additional offset of −π/9 radians besides an offset of π electrical radians. On the other hand, with respect to the stator teeth 572a, the stator tooth 571a is arranged with an additional offset of +π/9 radians besides an offset of π electrical radians. Regarding such an arrangement, with respect to the current supplied to the stator coil 591a, the current supplied to the stator coil 592a is advanced by 2π/9 radians.

<Synchronous Motor Drive System>

Figure 23:
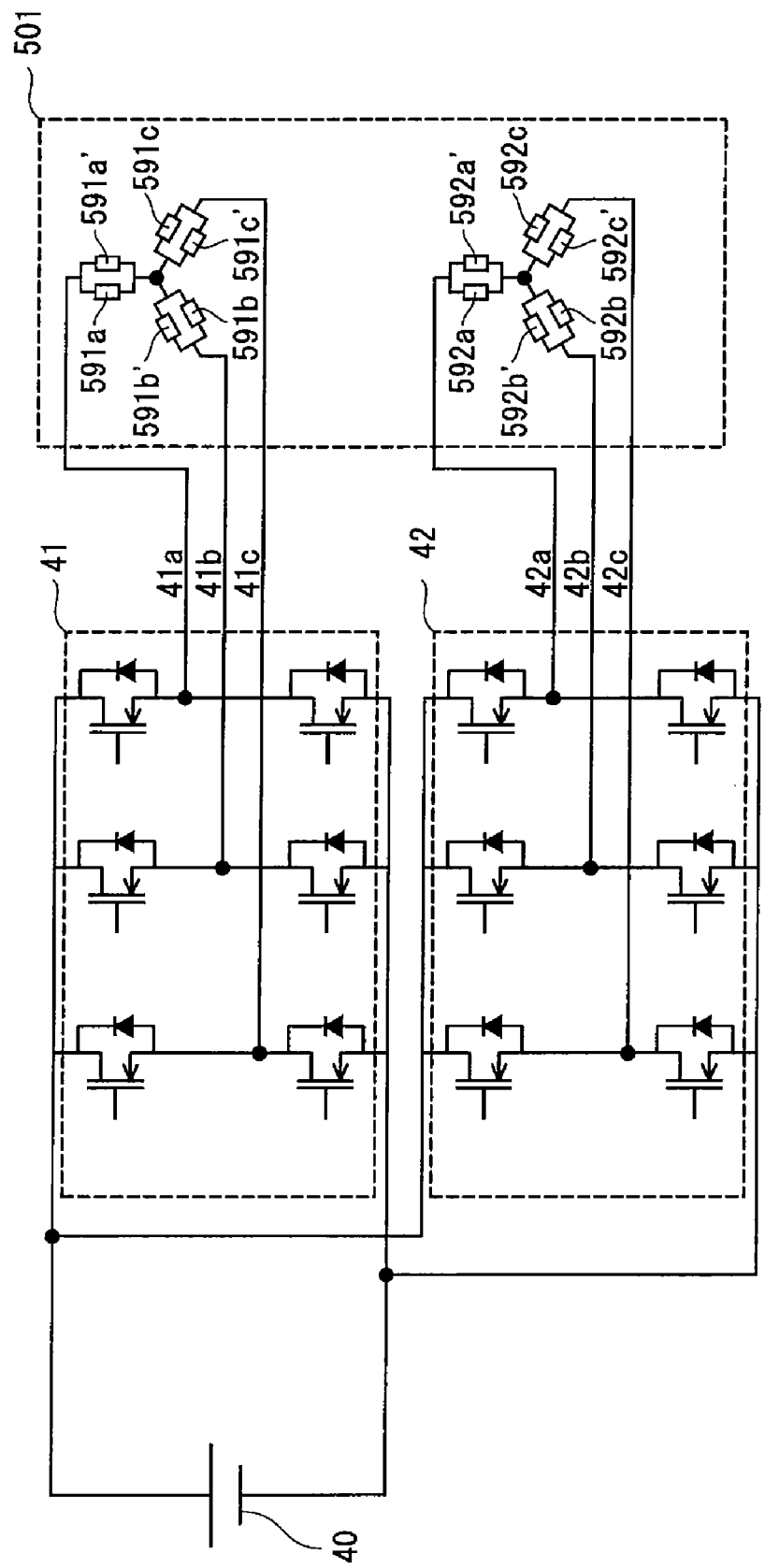
FIG. 23 shows an overall structure of the synchronous motor drive system pertaining to the fifth embodiment of the present invention.

FIG. 23 shows an overall structure of the synchronous motor drive system pertaining to the first embodiment of the present invention.

The synchronous motor drive system includes the motor driver and the synchronous motor 501. The motor driver includes a DC power supply 40 and inverters 41 and 42. The inverters 41 and 42 each generate three-phase currents to supply to the synchronous motor 501. The output currents 41a, 41b, and 41c supplied from the inverter 41 are out of phase from each other by 2π/3 radians. The output currents 42a, 42b, and 42c supplied from the inverter 42 are out of phase from each other by 2π/3 radians.

Attention is now paid to the output currents 41a and 42a among the output currents supplied from the inverters 41 and 42. The output current 41a and the output current 42a are out of phase from each other by 2π/9 radians. Similarly, the output current 41b and the output current 42b are out of phase from each other by 2π/9 radians. The output current 41c and the output current 42c are out of phase from each other by 2π/9 radians. The output currents 41a and 42a correspond to the currents 591a and 592a in FIG. 22, respectively.

<Effects>

As mentioned above, in the synchronous motor 501, the magnet torque obtained from the stator teeth 571a, 572a, and 573a is each maximized, while the number of the three-phase inverters are reduced to two. Accordingly, the total torque is increased.

Furthermore, in the synchronous motor 501, the stator coils are wound around the stator teeth by a method similar to concentrated winding. For this reason, compared with the synchronous motor in which stator coils are wound by distributed winding, coils extending outwardly from the ends of the stator (i.e. coil end portions) can be lowered, and the size of the synchronous motor is reduced.

Sixth Embodiment

In a sixth embodiment, two stator coils wound around the stator teeth 672a have N21 and N22 number of turns different from each other. Since the other structures except the above point are identical to the fifth embodiment, a description is omitted.

Figure 24:
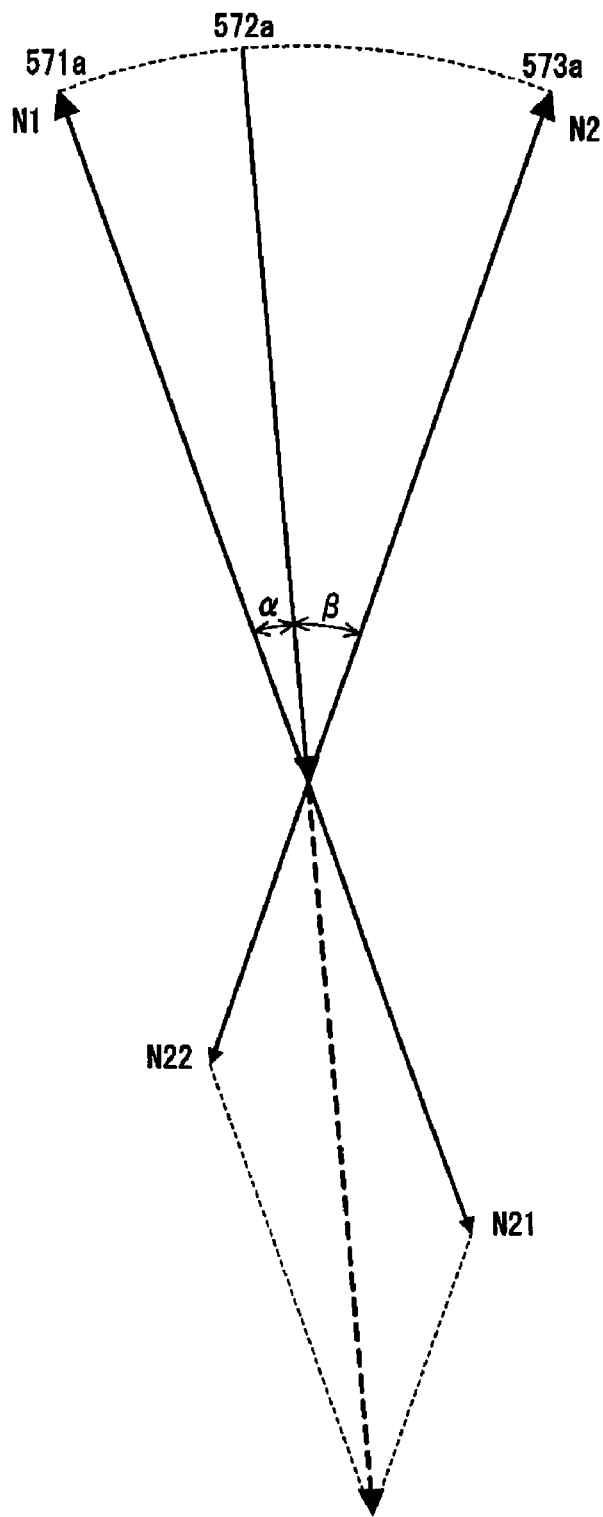
FIG. 24 is a vector diagram illustrating flux generated by stator teeth pertaining to a sixth embodiment of the present invention.

FIG. 24 is a vector diagram illustrating flux generated by stator teeth pertaining to the sixth embodiment of the present invention.

The vectors represent flux generated from the stator teeth. The size and direction of each vector indicates the flux number and the phase of the generated flux. As can be seen from FIG. 24, with respect to the flux generated form the stator tooth 571a, the flux to be generated from the stator tooth 572a is out of phase by (α+π) electrical radians. With respect to the flux to be generated form the stator tooth 573a, the flux to be generated from the stator tooth 572a is out of phase by (β+π) electrical radians (the phase difference includes +π radians since the flux to be generated is opposite to each other).

As can be clearly seen from FIGS. 24, N1, N2, N21, and N22 numbers of turns satisfy the following relations.

$N1=N2$ $N21=(N1)\sin(\beta)/\{\sin(\alpha+\beta)\}$ $N22=(N2)\sin(\beta)/\{\sin(\alpha+\beta)\}$ A specific description is given below of the cases of α=3π/36 radians and β=5π/36 radians.

Figure 25:
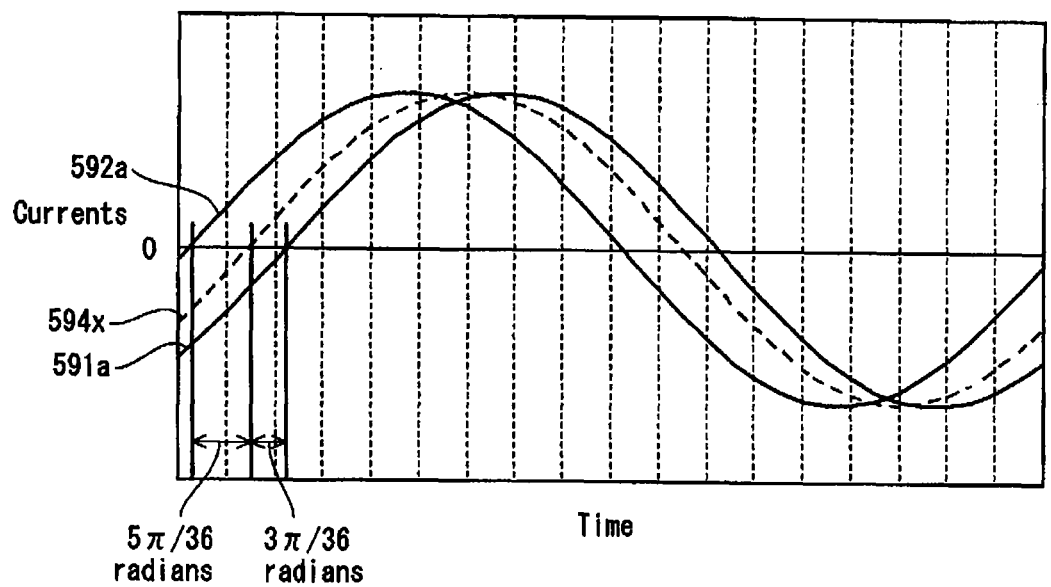
FIG. 25 shows temporal transitions of currents supplied to stator coils in the sixth embodiment.

FIG. 25 shows temporal transitions of currents applied to the stator coils in the sixth embodiment of the present invention.

As shown in FIG. 25, with respect to the current supplied to the stator coil 591a, the current supplied to the stator coil 592a is advanced by 2π/9 radians. In FIG. 25, the line 594x indicates vector synthesis of the currents supplied to the stator coil 591a (having N21 number of turns) and the stator coil 592a (having N22 number of turns) both wound around the stator tooth 572a. As can be clearly understood from the figure, the torque characteristics identical to the fourth embodiment is obtained in the sixth embodiment. In other words, even when there are phase differences between the flux generated from three stator teeth arranged at equal intervals in a stator teeth group, the synchronous motor yield increased torque, while decreasing the torque ripple, compared with motors using conventional technology. Furthermore, in the sixth embodiment, the number of the three-phase inverters is reduced more significantly than the fourth embodiment.

Torque Measurement Results

A description is given below of torque obtained in a conventional synchronous motor drive system, the synchronous motor drive system of the fifth embodiment, and the synchronous motor drive system of the sixth embodiment.

Figure 26:
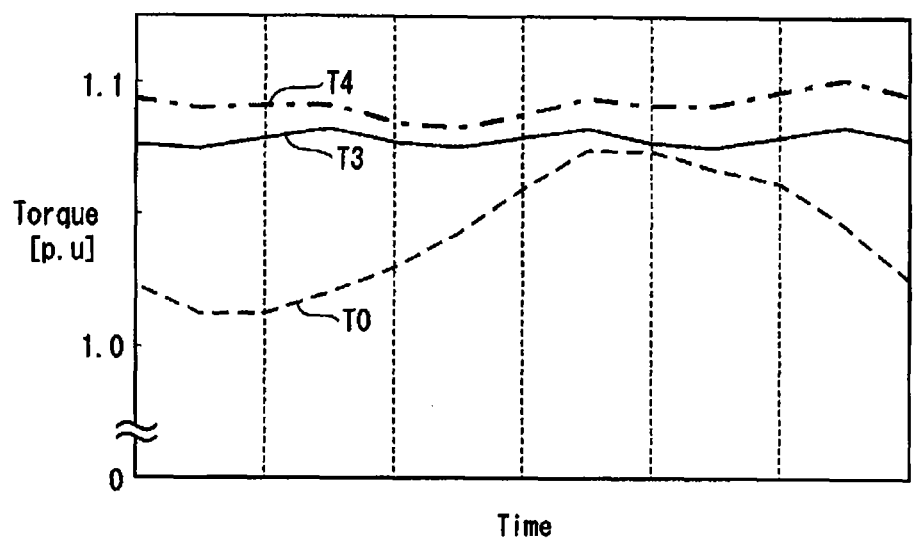
FIG. 26 shows temporal transitions of torque.

FIG. 26 shows temporal transitions of torque.

The line represented by T0 indicates temporal transitions of torque in the conventional synchronous motor drive system. The line T3 indicates temporal transitions of torque in the synchronous motor drive system of the fifth embodiment. The line T4 indicates temporal transitions of torque in the synchronous motor drive system of the sixth embodiment.

The line T0 is the same as that shown in FIG. 15. As shown in FIG. 26, the average torque obtained in the fifth embodiment and that obtained in the sixth embodiment are higher than the conventional structure. Further, the torque ripple represented by a ratio of a difference between maximum torque and minimum torque to average torque is approximately 6% according to the conventional technology. On the other hand, the torque ripple is lower than 1% in the fifth embodiment of the present invention. It is approximately 1% in the sixth embodiment.

As has been described so far, according to the present embodiment of the present invention, a decrease in torque is suppressed, while the torque ripple is reduced. Thus, the synchronous motor drive system of compact size, high output, low vibration, low noise, and improved efficiency is provided.

Seventh Embodiment

<Synchronous Motor>

Figure 27:
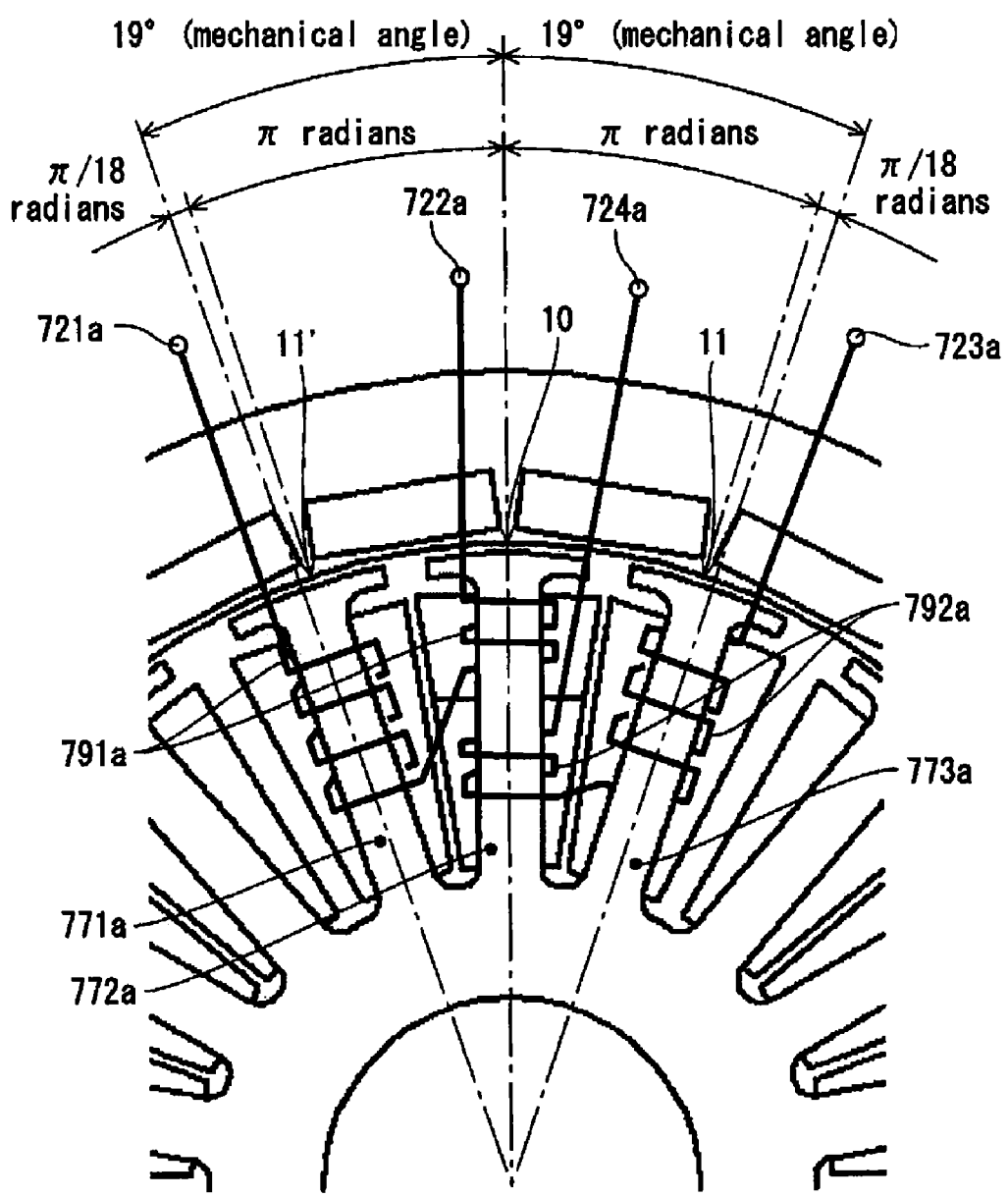
FIG. 27 is a detail view showing the synchronous motor included in the synchronous motor drive system pertaining to a seventh embodiment of the present invention.

FIG. 27 is a detail view showing the synchronous motor included in the synchronous motor drive system pertaining to a seventh embodiment of the present invention.

The seventh embodiment adopts the structure of the stator according to the second embodiment and the structure of the coils according to the fifth embodiment.

The stator teeth group is composed of three consecutive stator teeth 771a, 772a, and 773a.

The stator tooth 771a is positioned at +19 mechanical degrees (i.e. with an additional offset of +π/18 radians besides an offset of π radians) with respect to the stator tooth 772a.

The stator tooth 773a is positioned at −19 mechanical degrees (i.e. with an additional offset of −π/18 radians besides an offset of π radians) with respect to the stator tooth 772a.

The stator tooth 771a is wound with a part of stator coil 791a (having N1 number of turns). The stator tooth 773a is wound with a part of stator coil 792a (having N2 number of turns). The stator tooth 772a is wound with the remaining part of the stator coil 791a (having N21 number of turns) and the remaining part of the stator coil 792a (having N22 number of turns).

Regarding the numbers of turns of the stator coils 791a and 792a, the following relations are satisfied.

$N1=N2$ $N21=N22=(N1)/\{2\cos(\pi/18)\}$

With the above relations satisfied, the maximum flux values produced in the stator teeth 771a, 772a, and 773a are equalized.

<Driving Method>

Next, a description is given of a method for driving the synchronous motor.

Figure 28:
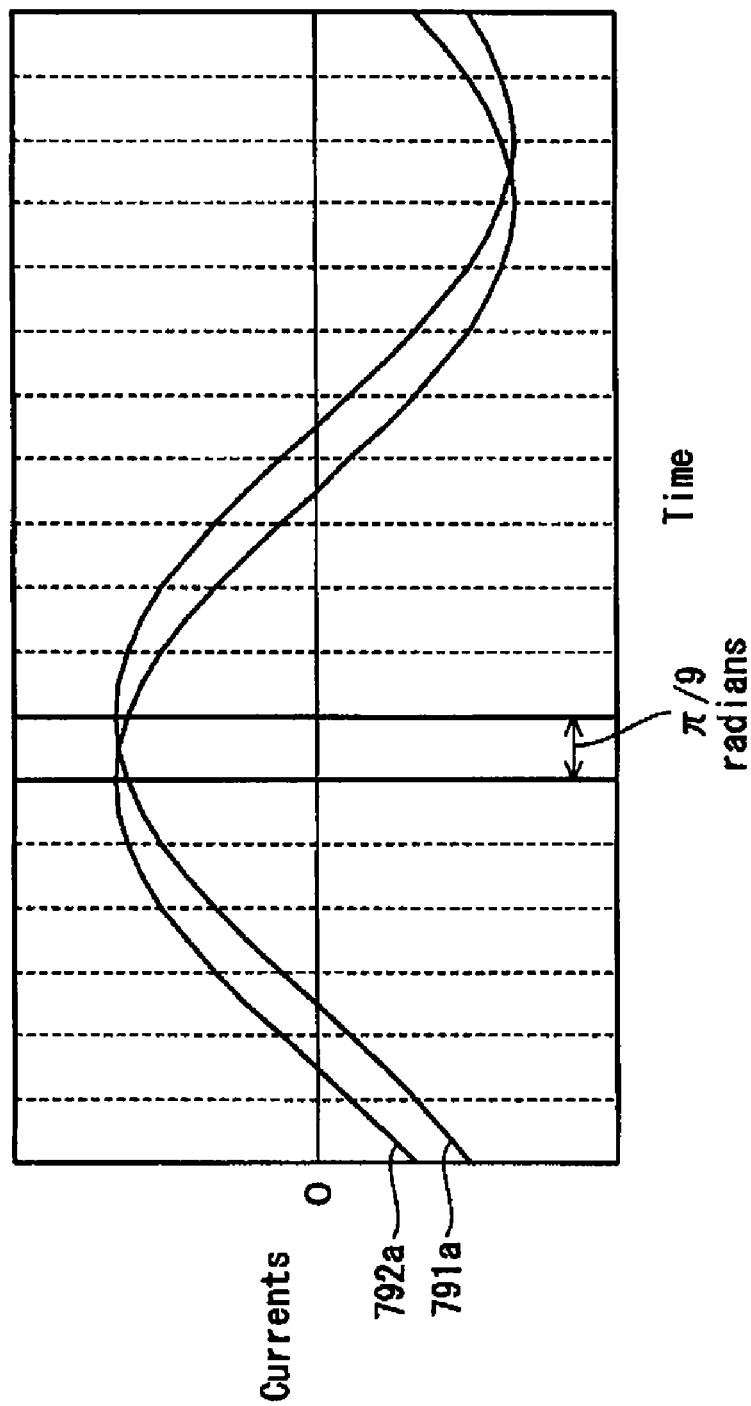
FIG. 28 shows temporal transitions of currents supplied to stator coils in the seventh embodiment.

FIG. 28 shows temporal transitions of currents applied to the stator coils in the seventh embodiment of the present invention.

As shown in FIG. 28, with respect to the current supplied to the stator coil 791a, the current supplied to the stator coil 792a is advanced by π/9 radians.

Between the arrangement of the stator coils and the currents supplied to the stator coils, the following relation is satisfied.

With respect to the stator tooth 772a, the stator tooth 773a is arranged with an additional offset of −π/18 radians besides an offset of π electrical radians. With respect to the stator tooth 772a, the stator tooth 771a is arranged with an additional offset of +π/18 radians besides an offset of π electrical radians. Regarding such an arrangement, with respect to the current supplied to the stator coil 791a, the current supplied to the stator coil 792a is advanced by π/9 radians.

With the above structures, the current flowing to the stator coil 792a is maximized when the center of the stator tooth 773a and the point 11 between magnetic poles of the rotor are aligned, whereby the magnet torque generated between the stator tooth 773a and the magnet poles is maximized. Further, the vector synthesis of the currents flowing to the stator coils 791a and 792a is maximized when the center of the stator tooth 772a and the point 10 between magnetic poles of the rotor are aligned, whereby the magnet torque generated between the stator tooth 772a and the magnet poles is maximized. Further, the current flowing to the stator coil 791a is maximized when the center of the stator tooth 771a and the point 11' between magnetic poles of the rotor are aligned, whereby the magnet torque generated between the stator tooth 771a and the magnet poles is maximized. As a result, the magnet torque obtained from each stator tooth is maximized. Accordingly, the total torque is increased.

In addition, in the fifth and seventh embodiments, the number (N21+N22) of turns the central stator tooth is wound is greater than the number N1(=N2) of turns the other two stator teeth are wound. As for the increase ratio (N21+N22)/N1, it is 1/cos(π/18) in the seventh embodiment, while it is 1/cos(π/9) in the fifth embodiment. That is to say that the increase ratio is smaller in the seventh embodiment than the fifth embodiment (approximately 95%). Accordingly, the seventh embodiment is useful for the purpose of reducing the size of the synchronous motor.

Eighth Embodiment

<Synchronous Motor>

An eighth embodiment differs from the fifth embodiment with respect to the structure of coils. Apart from that, the eighth embodiment is the same as the fifth embodiment.

Figure 29:
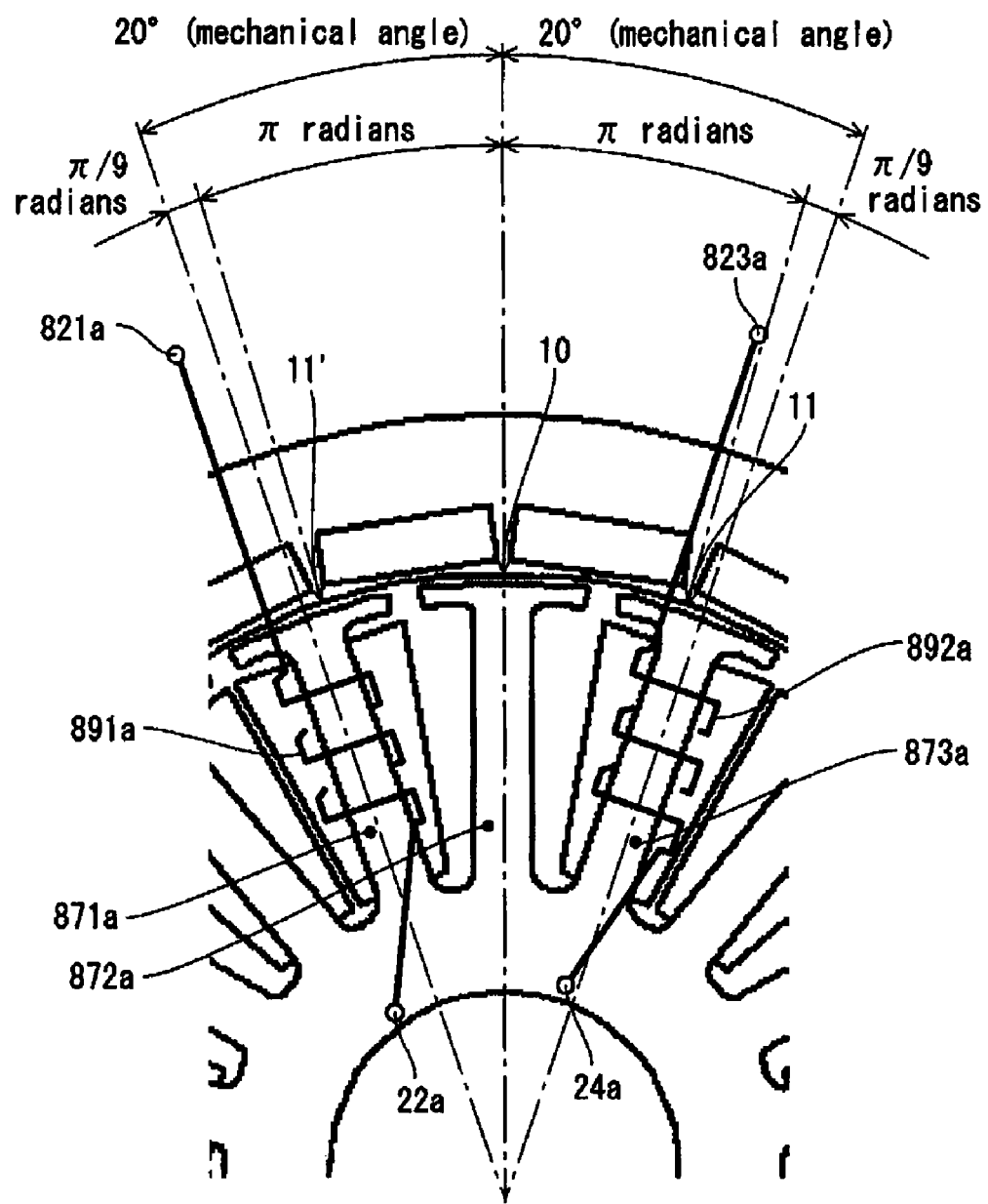
FIG. 29 is a detail view showing the synchronous motor included in the synchronous motor drive system pertaining to an eighth embodiment of the present invention.

FIG. 29 is a detail view showing the synchronous motor included in the synchronous motor drive system pertaining to the eighth embodiment of the present invention.

The stator teeth group is composed of three consecutive stator teeth 871a, 872a, and 873a.

The stator tooth 871a is positioned at +20 mechanical degrees (i.e. with an additional offset of +π/9 radians besides an offset of π radians) with respect to the stator tooth 872a.

The stator tooth 873a is positioned at −20 mechanical degrees (i.e. with an additional offset of −π/9 radians besides an offset of π radians) with respect to the stator tooth 872a.

The stator tooth 871a is wound with a stator coil 891a. The stator tooth 873a is wound with a stator coil 892a. The stator tooth 872a is not wound with a stator coil.

<Driving Method>

Figure 30:
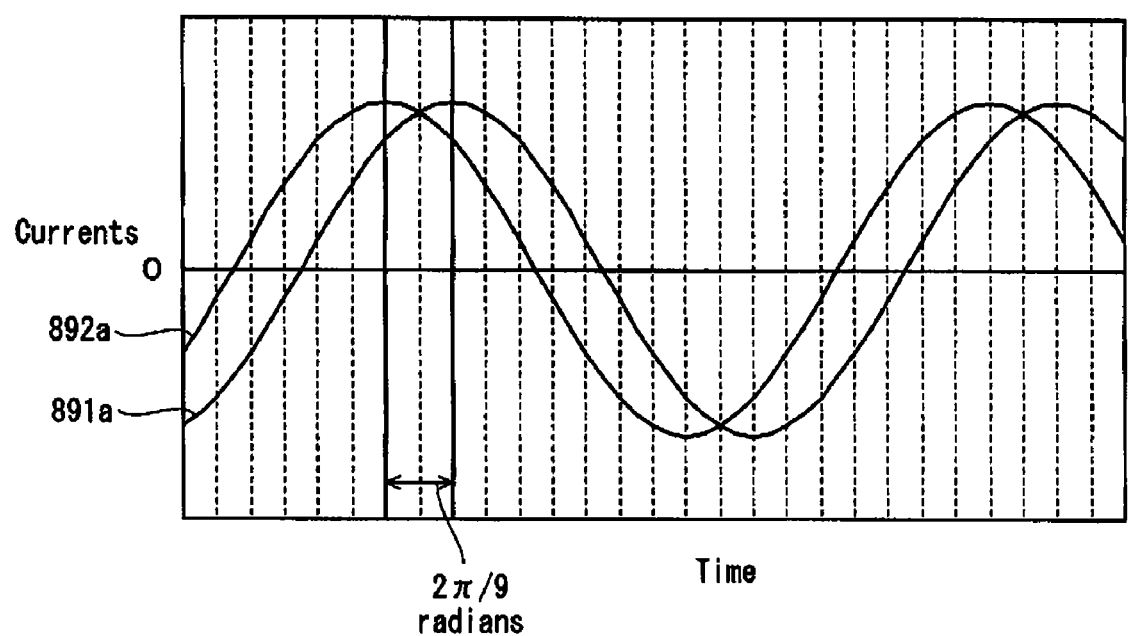
FIG. 30 shows temporal transitions of currents supplied to stator coils in the eighth embodiment.

FIG. 30 shows temporal transitions of currents applied to the stator coils in the eighth embodiment of the present invention. With respect to the current supplied to the stator coil 891a, the current supplied to the stator coil 892a is advanced by 2π/9 radians.

Between the arrangement of the stator coils and the currents supplied to the stator coils, the following relation is satisfied.

With respect to the stator teeth 872a, the stator tooth 873a is arranged with an additional offset of −π/9 radians besides an offset of π electrical radians. On the other hand, with respect to the stator teeth 872a, the stator tooth 871a is arranged with an additional offset of +π/9 radians besides an offset of π electrical radians. Regarding such an arrangement, with respect to the current supplied to the stator coil 891a, the current supplied to the stator coil 892a is advanced by 2π/9 radians.

With the above structures, the current flowing to the stator coil 892a is maximized when the center of the stator tooth 873a and the point 11 between magnetic poles of the rotor are aligned, whereby the magnet torque generated between the stator tooth 873a and the magnet poles is maximized. Further, the current flowing to the stator coil 891a is maximized when the center of the stator tooth 871a and the point 11' between magnetic poles of the rotor are aligned, whereby the magnet torque generated between the stator tooth 871a and the magnet poles is maximized. As a result, the magnet torque obtained from each stator tooth is maximized. Accordingly, the total torque is increased.

Meanwhile, although in the above embodiment the intervals between the stator teeth are 20 mechanical degrees, it is possible to change the intervals to 19 mechanical degrees to secure a larger space for the coils.

Although in the present embodiment the stator tooth 872a is not wound with a stator coil, the stator tooth 872a may be wound with a sensor coil that is not identical to the driving coils. It is possible to specify the position of the rotor by detecting induced voltage in the sensor coil. The position of the rotor may also be specified by applying, to the sensor coil, a high frequency voltage that is not identical to the driving currents, and detecting the currents under influence of the inductance.

<Effects>

Thus, in the eighth embodiment, the number of the three-phase inverters is reduced to two. Further, the stator tooth 872a works with two consecutive stator teeth 871a and 873a to form a path from an N-pole to an S-pole of the magnetic poles of the rotor. Accordingly, the eighth embodiment is useful for the synchronous motor of a relatively small diameter that has difficulty in finding a large space for coils to increase the number of the stator teeth.

Modification

Figure 31:
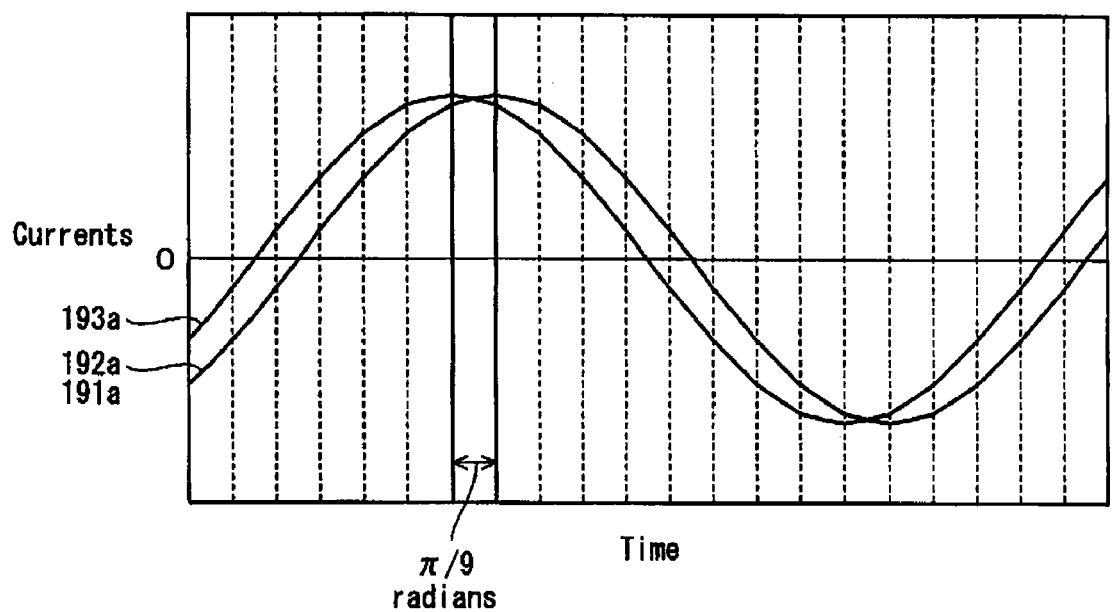
FIG. 31 shows temporal transitions of currents supplied to stator coils in a modification of the present invention.

Although the synchronous motor drive system has been described above in accordance with the embodiments, the present invention should not be limited to these. The following modifications are included within the scope of the invention. In the first to fourth embodiments, three stator coils belonging to a stator teeth group each extend to outside to be supplied with currents of different phases. However, the present invention is not limited to this. Even when only two of three consecutive stator coils are supplied with currents of different phases, a certain level of effect is obtained. For example, FIG. 31 shows that, in the stator similar to the first embodiment, the stator coils 191a and 192a are supplied with currents of the same phase, whereas the stator coil 193a is supplied with a current that is advanced by π/9 radians with respect to the currents supplied to the stator coils 191a and 192a.

(2) Although in the first to fourth embodiments, the case in which a stator teeth group is composed of three (M=3) stator teeth has been described, the present invention is not limited to this. The number M may be an integer two or greater. Now, a description is given of the case in which a stator teeth group is composed of M stator teeth.

Theoretically speaking, M consecutive stator teeth in a stator teeth group can be arranged at intervals of at most $(\pi+2\pi/3M)$ electrical radians. Further, if the stator coils wound around consecutive stator teeth have properties to generate magnetic fields of alternately opposite phases in response to currents of the same phase, these stator coils can be supplied with currents having a phase difference within a range of $\pm 2\pi/3M$ radians from each other.

Practically, however, it is preferable to arrange the consecutive stator teeth in a stator teeth group at intervals of at most $(\pi+\pi/3m)$ electrical radians. Further, if the stator coils wound around consecutive stator teeth have properties to generate magnetic fields of alternately opposite phases in response to currents of the same phase, these stator coils may be supplied with currents having a phase difference within a range of $\pm\pi/3M$ radians from each other.

As an example, it is assumed that M=5. Then, the number of stator teeth is thirty (arranged at intervals of 12 mechanical degrees), and the number of the magnet poles of the rotor is 32 (with π electrical radians equaling to 360/32=11.25 mechanical degrees). Consecutive stator coils are arranged at intervals of at most $(\pi+\pi/15)$ electrical radians. Further, in two consecutive stator coils with one positioned at most $(\pi+\pi/15)$ electrical radians ahead of the other with respect to the rotation direction of the rotor, the current supplied to the one positioned ahead of the other is delayed by $(\pi+\pi/15)$ radians with respect to the current supplied to the other coil.

(3) Although in the fifth to the eighth embodiments, the case in which a stator teeth group is composed of three (M=3) stator teeth has been described, the present invention is not limited to this. The number M may be an integer three or greater. Now, a description is given of the case in which a stator teeth group is composed of M stator teeth.

Theoretically speaking, M consecutive stator teeth in a stator teeth group can be arranged at intervals of at most $(\pi+2\pi/3M)$ electrical radians. These stator coils 591a and 592a may be supplied with currents having a phase difference within a range of $\pm 2\pi/3M$ radians from each other.

Practically, however, it is preferable to arrange the consecutive stator teeth in a stator teeth group at intervals of at most $(\pi+\pi/3M)$ electrical radians. The stator coils 591a and 592a may be supplied with currents having a phase difference of at most $2\pi/3M$ radians from each other.

(4) In the fifth to the seventh embodiments, the numbers N1, N2, N21, and N22 of turns satisfy the following relations.

$$N1=N2$$

$$N21=(N1)\sin(\beta)/\{\sin(\alpha+\beta)\}$$

$$N22=(N2)\sin(\beta)/\{\sin(\alpha+\beta)\}$$

In the above relations, $\alpha=\beta=\pi/9$ in the fifth embodiment, and $\alpha=\beta=\pi/18$ in the seventh embodiment.

Yet, the present invention is not limited to the above and may satisfy the following relations.

$$N1=N2$$

$$N21=N22=(N1)/2$$

In the case in which the above relations are satisfied, the numbers of turns three stator teeth belonging to a stator teeth group are wound may be equalized. Accordingly, space factor of coils, namely the proportion of stator coils to space in which the stator coils are disposed, is increased. The above relations also provide an effect that the synchronous motor yields increased torque while decreasing the torque ripple.

Figure 32:
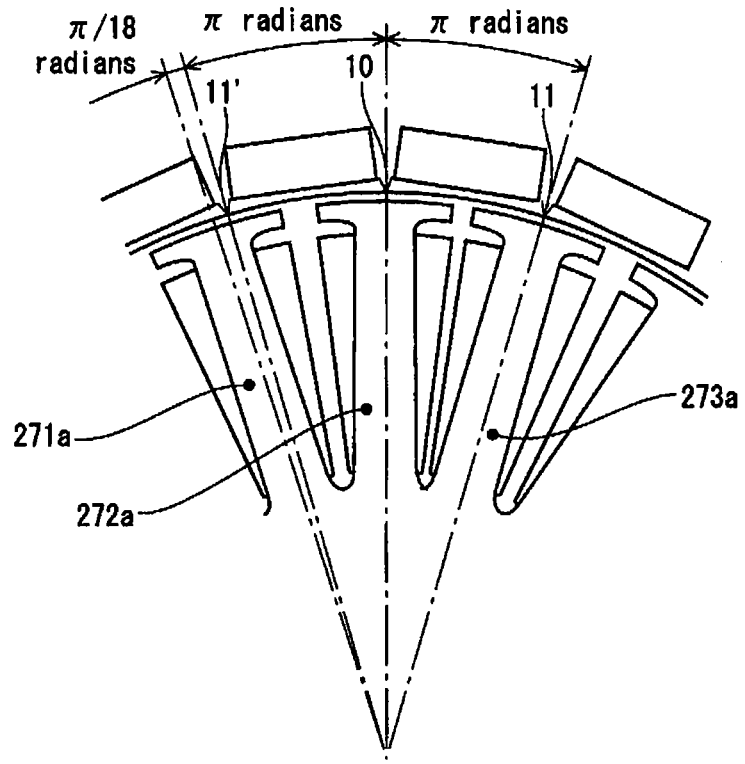
FIG. 32 is a detail view of the synchronous motor in the modification of the present invention.

(5) In the first to the eighth embodiments, the intervals between the stator coils belonging to a stator teeth group do not coincide with the intervals between the magnet poles of the stator. However, the present invention is not limited to the embodiments. It can also be envisaged that only an interval between two consecutive stator coils differs from the intervals between the magnet poles of the rotor. For example, FIG. 32 shows that the interval between the stator teeth 271a and 272a differs from the intervals between the magnet poles of the rotor. The interval between the stator teeth 272a and 273a coincides with the intervals between the magnet poles of the rotor.

Figure 33:
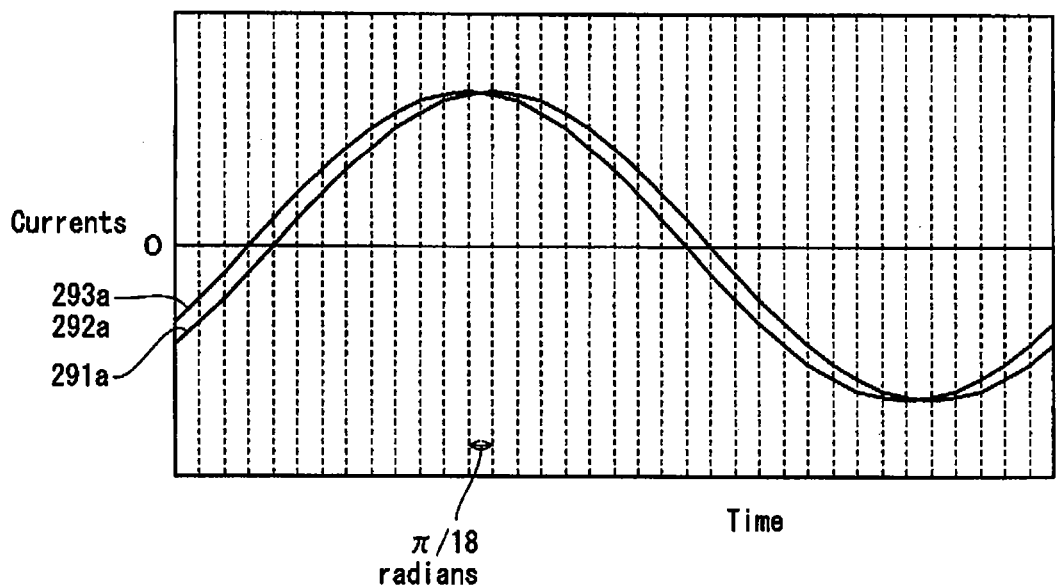
FIG. 33 shows temporal transitions of currents supplied to stator coils in the modification of the present invention.

It is possible to cause the synchronous motor with the structure shown in FIG. 32 to yield increased torque by applying the currents shown in FIG. 33.

(6) Although in the fifth to the eighth embodiments the stator coils 591a and 592a are supplied with currents having a phase difference of $2\pi/9$ radians from each other, the present invention is not limited to the embodiments. It is also possible to supply the currents having a phase difference within a range of $\pm 2\pi/3M$ radians from each other to the stator coils 591a and 592a.

(7) In the first to the eighth embodiments, the stator coils are wound around the stator teeth. However, the present invention is not limited to these embodiments, and is applicable to what is called a coreless motor which has no stator teeth, instead.

(8) Although no specific description is given in the first to the eighth embodiments, the stator teeth may be arranged in a skew arrangement to be skewed relative to the rotation direction of the rotor along a rotation axis of the rotor by at most an interval between two consecutive stator teeth.

(9) The first to eighth embodiments exemplify an outer rotor type synchronous motor in which the rotor is disposed outside the stator. However, the same effect can be achieved by an inner rotor type synchronous motor in which the rotor is disposed inside the stator, a so-called axial gap type synchronous motor in which the rotor and the stator are disposed with a space in between in the axial direction, and a synchronous motor with a combination of these structures.

(10) In the first to the eighth embodiments, the magnetic poles of the rotor are created by permanent magnets. However, the present invention is applicable to synchronous motors using reluctance torque generated from a difference in magnetoresistance or synchronous motors which utilize a combination of permanent magnets and reluctance torque.

(11) The present invention is applicable not only to synchronous motors but also to synchronous electric generators as well as to direct driven linear synchronous motors and linear synchronous electric generators.

(12) The present invention is able to provide a synchronous motor drive system of compact size, high output, low vibration, low noise, and high efficiency, and accordingly, is particularly useful for vehicles which require low vibration and low noise.

INDUSTRIAL APPLICABILITY

The present invention is applicable to synchronous motor drive systems for compressors, electrical vehicles, hybrid vehicles, fuel-cell vehicles, and the like, as these synchronous motors require compact size, high efficiency, low vibration, and low noise.

REFERENCE SIGNS LIST 2 rotor
4 rotor core
5 permanent magnet
6 magnetic pole
10 point between magnetic poles of the rotor
11 point between magnetic poles of the rotor
21a, 22a, 23a, 24a, 25a, 26a coil terminal
40 DC power supply
41, 42, 43 inverter
71a, 72a, 73a stator teeth
91a, 92a, 93a stator coil
101, 201, 501 synchronous motor
103, 203, 503 stator
107, 207, 507 stator teeth
108, 208, 508 stator teeth group
109, 209, 509 stator coil
171a, 172a, 173a stator teeth
271a, 272a, 273a stator teeth
571a, 572a, 573a stator teeth
671a, 672a, 673a stator teeth
771a, 772a, 773a stator teeth
871a, 872a, 873a stator teeth
191a, 192a, 193a stator coil
291a, 292a, 293a stator coil
391a, 392a, 393a stator coil
591a, 592a stator coil
691a, 692a stator coil
791a, 792a stator coil
891a, 892a stator coil

The invention claimed is:

1. A synchronous motor drive system including a synchronous motor and a motor driver,
the synchronous motor comprising:
a rotor having magnetic poles distributed circumferentially along a rotation direction of the rotor at equal intervals; and
a stator having stator coils arranged circumferentially along the rotation direction of the rotor, each coil wound by concentrated winding, wherein
every M consecutive stator coils belong to a different one of stator coil groups arranged at equal intervals, M being an integer three or greater,
every N consecutive stator coil groups belong to a different one of stator coil group sets, N being an integer two or greater, any one stator coil group in each set being in a same position in terms of electrical angle as one stator coil group in any other set, so that the sets of consecutive stator coil groups have rotational symmetry about a rotation axis of the rotor,
each of the M consecutive stator coils in each stator coil group is connected at one end to a separate terminal of the motor driver and to a neutral point at another end,
any two consecutive stator coils in each stator coil group have properties to generate magnetic fields having opposite polarities in response to currents of a same phase supplied via the respective terminals,
the M consecutive stator coils are arranged at an interval of $\pi + (\pi/(3M))$ radians, and
the motor driver supplies currents having a phase difference of $n/(3M)$ radians to the any two consecutive stator coils via the respective terminal.

2. The synchronous motor drive system of claim 1, wherein the stator coil groups are arranged at intervals of $2\pi/3$ electrical radians,
the motor driver supplies currents having a phase difference of $2\pi/3$ radians to a stator coil belonging to one of the stator coil groups and a corresponding stator coil belonging to another stator coil group consecutive to the one of the stator coil groups.

3. The synchronous motor drive system of claim 1, wherein the M consecutive stator coils in each stator coil group are connected to separate terminals.

4. The synchronous motor drive system of claim 1, wherein the M consecutive stator coils in each stator coil group are first, second, and third stator coils, the first stator coil being positioned more than $\pi$ electrical radians ahead of the second stator coil with respect to the rotation direction of the rotor, the third stator coil being positioned more than π electrical radians behind the second stator coil with respect to the rotation direction of the rotor, each of the first, the second, and the third stator coils is connected at one end to a separate terminal and to a neutral point at another end, and the first, the second, and the third stator coils have properties to generate magnetic fields having alternately opposite polarities in response to currents of a same phase supplied via the respective terminals, with respect to a current supplied from the motor driver to the second stator coil, a current supplied from the motor driver to the first stator coil is delayed by a first phase difference, and with respect to a current supplied from the motor driver to the second stator coil, a current supplied from the motor driver to the third stator coil is advanced by a second phase difference different from the first phase difference.

5. The synchronous motor drive system of claim 1, wherein the number of the magnetic poles in the rotor is 10q, and the number of stator coils in the stator is 9q, q being an integer two or greater.

6. The synchronous motor drive system of claim 1, wherein M is 5, and
the number of the magnetic poles in the rotor is 30, and the number of stator coils in the stator is 32.

7. A synchronous motor drive system including a synchronous motor and a motor driver,
the synchronous motor comprising:
a rotor having magnetic poles distributed circumferentially along a rotation direction of the rotor at equal intervals; and
a stator having stator teeth arranged circumferentially along the rotation direction of the rotor, wherein
every M consecutive stator teeth belong to a different one of stator teeth groups arranged at equal intervals, M being an integer three or greater,
at least two of consecutive first, second, and third stator teeth in each stator teeth group are arranged at an interval different from the intervals of the magnetic poles of the rotor,
the first stator tooth is wound with part of a first stator coil,
the third stator tooth is wound with part of a second stator coil,
the second stator tooth is wound with a remaining part of the first stator coil and a remaining part of the second stator coil,
each of the first and the second stator coils is connected at one end to a separate terminal and to a neutral point at another end, and
the motor driver supplies currents of different phases to the first and the second stator coils via the respective terminals.

8. The synchronous motor drive system of claim 7, wherein
the stator teeth groups are arranged at intervals of $2\pi/3$ electrical radians,
the motor driver supplies currents having a phase difference of $2\pi/3$ radians to the first stator coils belonging to two consecutive stator teeth groups, and supplies currents having a phase difference of $2\pi/3$ radians to the second stator coils belonging to two consecutive stator teeth groups.

9. The synchronous motor drive system of claim 8, wherein
the part of the first stator coil and the remaining part of the first stator coil are wound around the first stator tooth and the second stator tooth, respectively, so as to generate magnetic fields having opposite polarities, the part of the second stator coil and the remaining part of the second stator coil are wound around the third stator tooth and the second stator tooth, respectively, so as to generate magnetic fields having opposite polarities, the remaining parts of the first and the second stator coils are wound around the second stator tooth so as to generate magnetic fields having a same polarity in response to currents of a same phase, and the currents supplied from the motor driver to the first and the second stator coils have a phase difference of $2\pi/(3M)$ radians.

10. The synchronous motor drive system of claim 7, wherein
the first stator tooth is positioned more than π electrical radians ahead of the second stator tooth with respect to the rotation direction of the rotor,
the third stator coil is positioned more than π electrical radians behind the second stator tooth with respect to the rotation direction of the rotor,
the part of the first stator coil and the remaining part of the first stator coil are wound around the first stator tooth and the second stator tooth, respectively, so as to generate magnetic fields having opposite polarities,
the part of the second stator coil and the remaining part of the second stator coil are wound around the third stator tooth and the second stator tooth, respectively, so as to generate magnetic fields having opposite polarities,
the remaining parts of the first and the second stator coils are wound around the second stator tooth so as to generate magnetic fields having a same polarity in response to currents of a same phase.

11. The synchronous motor drive system of claim 10, wherein
the first stator tooth is positioned at most $\pi/(3M)$ radians besides π radians ahead of the second stator tooth,
the third stator tooth is positioned at most $\pi/(3M)$ radians besides π radians behind the second stator tooth,
with respect to the current supplied to the second stator coil, the current supplied to the first stator coil is delayed by at most $2\pi/(3M)$ radians.

12. The synchronous motor drive system of claim 7, wherein
every three consecutive stator teeth belong to a different one of stator teeth groups, and
the first, the second, and the third stator teeth are arranged at equal intervals different from the intervals of the magnetic poles of the rotor.

13. The synchronous motor drive system of claim 12, wherein
the first, the second, and the third stator teeth are arranged at the equal intervals of $(\pi+\alpha)$ electrical radians,
the following relations are satisfied:

$$N1=N2$$

$$N21=N22=(N1)/2 \cos \alpha$$

where
the part of the first stator coil has N1 number of turns, the part of the second stator coil has N2 number of turns, the remaining part of the first stator coil has N21 number of turns, and the remaining part of the second stator coil has N22 number of turns.

14. The synchronous motor drive system of claim 12, wherein
the following relations are satisfied:

$$N1 = N2$$
$$N21 = N22 = (N1)/2$$

where
the part of the first stator coil has N1 number of turns, the part of the second stator coil has N2 number of turns, the remaining part of the first stator coil has N21 number of turns, and the remaining part of the second stator coil has N22 number of turns.

15. The synchronous motor drive system of claim 7, wherein
the motor driver supplies the currents having a phase difference of $2\pi/(3M)$ radians to the first and the second stator coils via the respective terminals.

* * * * *

UNITED STATES PATENT AND TRADEMARK OFFICE
CERTIFICATE OF CORRECTION

PATENT NO. : 8,390,165 B2
APPLICATION NO. : 12/995143
DATED : March 5, 2013
INVENTOR(S) : Nishiyama et al.

It is certified that error appears in the above-identified patent and that said Letters Patent is hereby corrected as shown below:

In the Claims:

Claim 1, Col. 24, line 51: "n/(3M)" should read -- $\pi$/(3M) --.

Signed and Sealed this
Thirtieth Day of July, 2013

Teresa Stanek Rea
*Acting Director of the United States Patent and Trademark Office*